United States Patent
Bird et al.

(10) Patent No.: US 6,735,605 B2
(45) Date of Patent: May 11, 2004

(54) METHOD AND APPARATUS FOR SYNCHRONIZING NOT-LOGGED APPLICATION TEMPORARY TABLES IN A MULTI-NODE RELATIONAL DATABASE MANAGEMENT SYSTEM

(75) Inventors: Paul M. Bird, Toronto (CA); Yuk Kuen Chan, Scarborough (CA); Jesse Lee, Toronto (CA); Hebert W. Pereyra, Toronto (CA); Yeung-Kuen See, Toronto (CA); Michael J. Snowbell, Thornhill (CA); Catharina K. Wong, Etobicoke (CA)

(73) Assignee: International Business Machines Corporation, Amonk, NY (US)

( * ) Notice: Subject to any disclaimer, the term of this patent is extended or adjusted under 35 U.S.C. 154(b) by 280 days.

(21) Appl. No.: 09/796,843

(22) Filed: Feb. 28, 2001

(65) Prior Publication Data

US 2002/0078058 A1 Jun. 20, 2002

(30) Foreign Application Priority Data

Jun. 2, 2000 (CA) .............................. 2310578

(51) Int. Cl.$^7$ ............................. G06F 17/30
(52) U.S. Cl. .................... 707/205; 715/509; 707/10; 707/102
(58) Field of Search ............. 707/1–10, 100–141; 715/509; 709/223–229

(56) References Cited

U.S. PATENT DOCUMENTS

| | | | |
|---|---|---|---|
| 5,241,648 A | | 8/1993 | Cheng et al. ............... 707/200 |
| 5,276,870 A | | 1/1994 | Shan et al. ................. 707/200 |
| 5,806,056 A | * | 9/1998 | Hekmatpour ................ 706/50 |
| 5,933,601 A | * | 8/1999 | Fanshier et al. ............ 709/223 |
| 5,940,289 A | * | 8/1999 | Iwata et al. ................. 700/2 |

* cited by examiner

Primary Examiner—Jean R. Homere
Assistant Examiner—Mohammad Ali
(74) Attorney, Agent, or Firm—Sawyer Law Group LLP

(57) ABSTRACT

A multi-node relational database management system is provided that can be embodied in software for managing a database having declared temporary tables associated with respective software application programs. The system comprises a plurality of nodes. The nodes include a catalog node for maintaining a list of identifiers for declared temporary tables associated with any application; a coordinator node for an application; at least one subordinate node for the application, the subordinate node having at least one partition of the declared temporary tables of the application; and a declared temporary table manager for causing the coordinator node to maintain for the application a list of declared temporary tables.

33 Claims, 26 Drawing Sheets

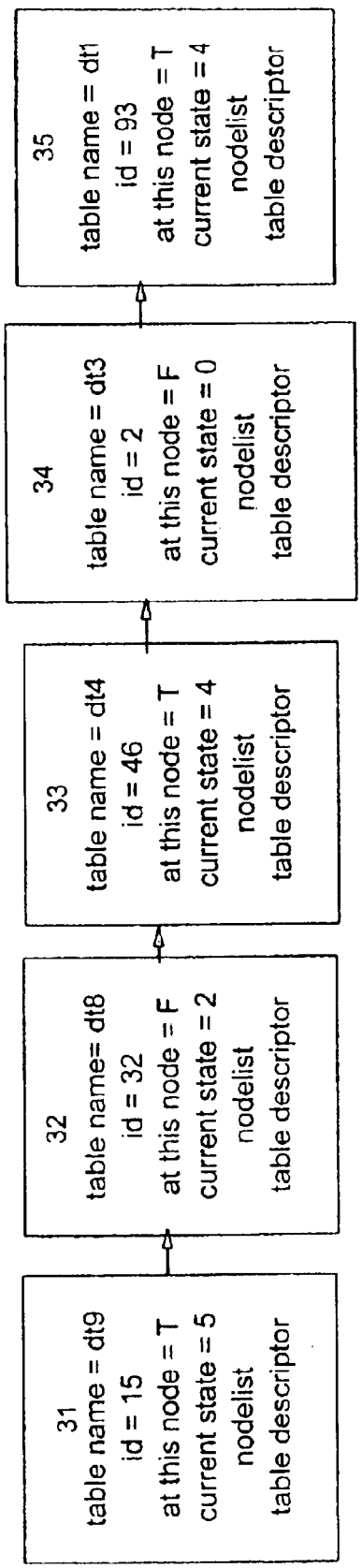
Fig 3. A list of declared temporary tables maintained at coordinator node 2 for A1
Possible states are represented by the sum of zero or more of the following values:
1: created in the current transaction
2: dropped in the current transaction
4: modified in the current transaction
8: inoperative
0: none of the above states

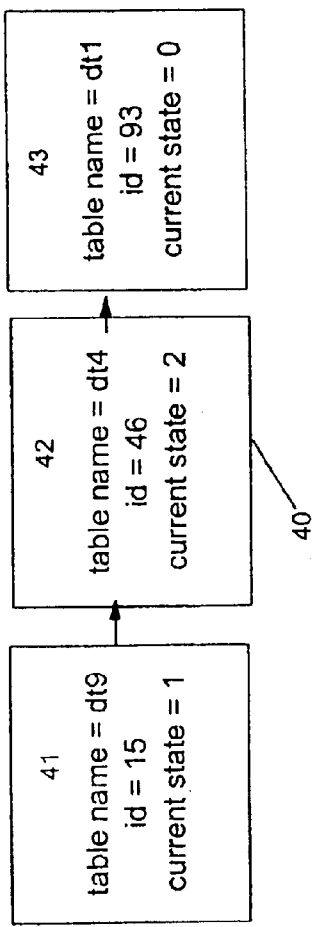
Fig 4a. list of declared temporary tables at subordinate node 3 in nodegroup 1
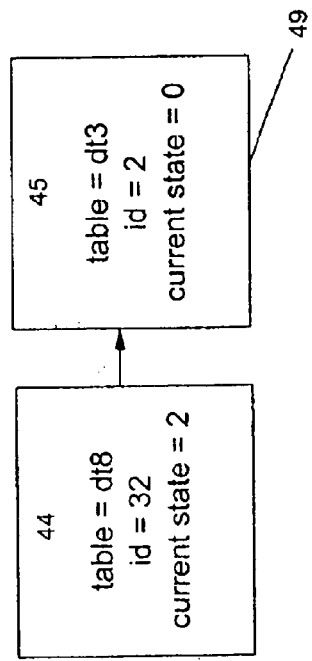
Fig. 4b. list of declared temporary tables at a subordinate node 4 in nodegroup 2
Possible states are represented by one of the following values:
1: created in the current transaction
2: dropped in the current transaction
0: neither created nor dropped in the current transaction

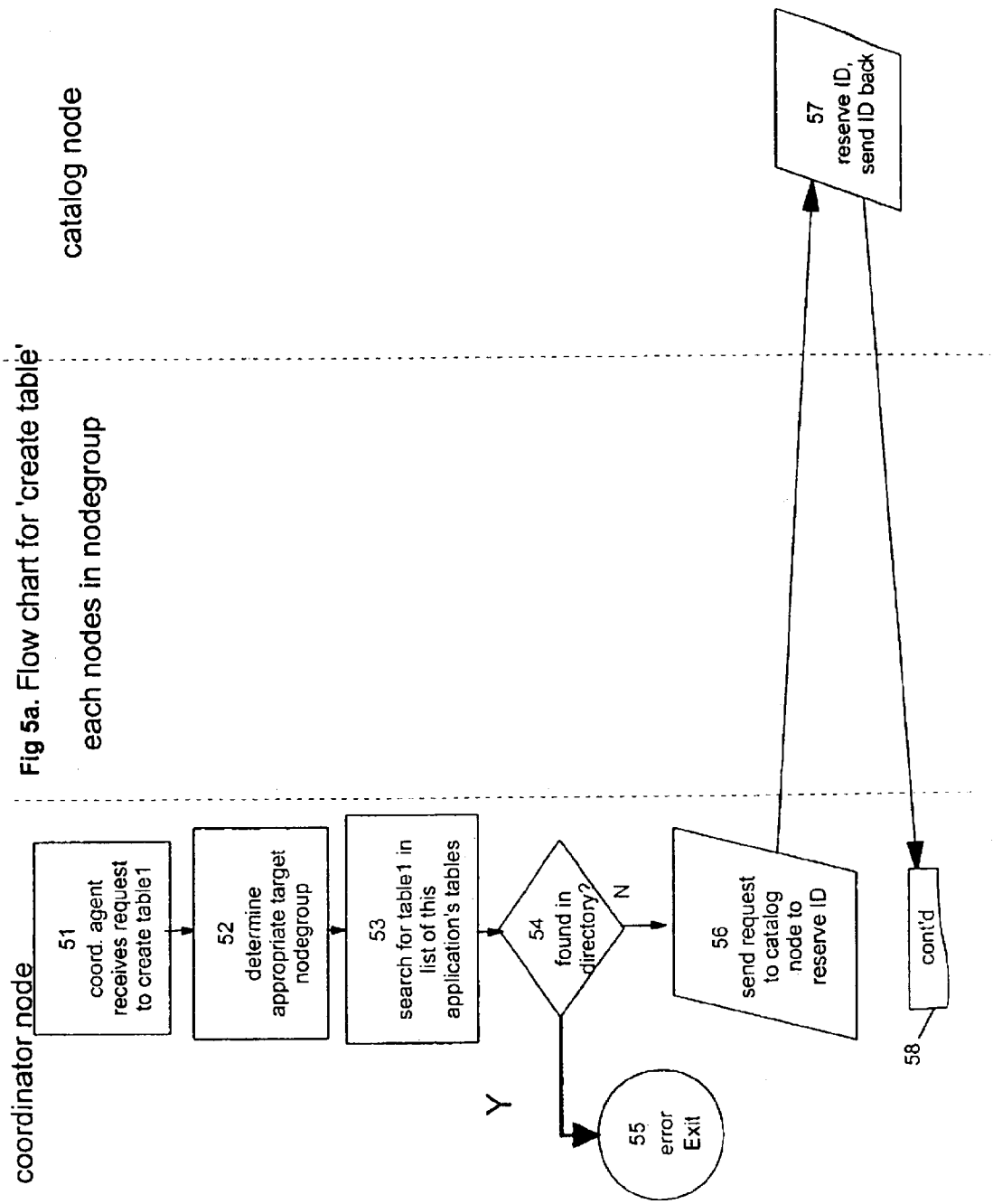

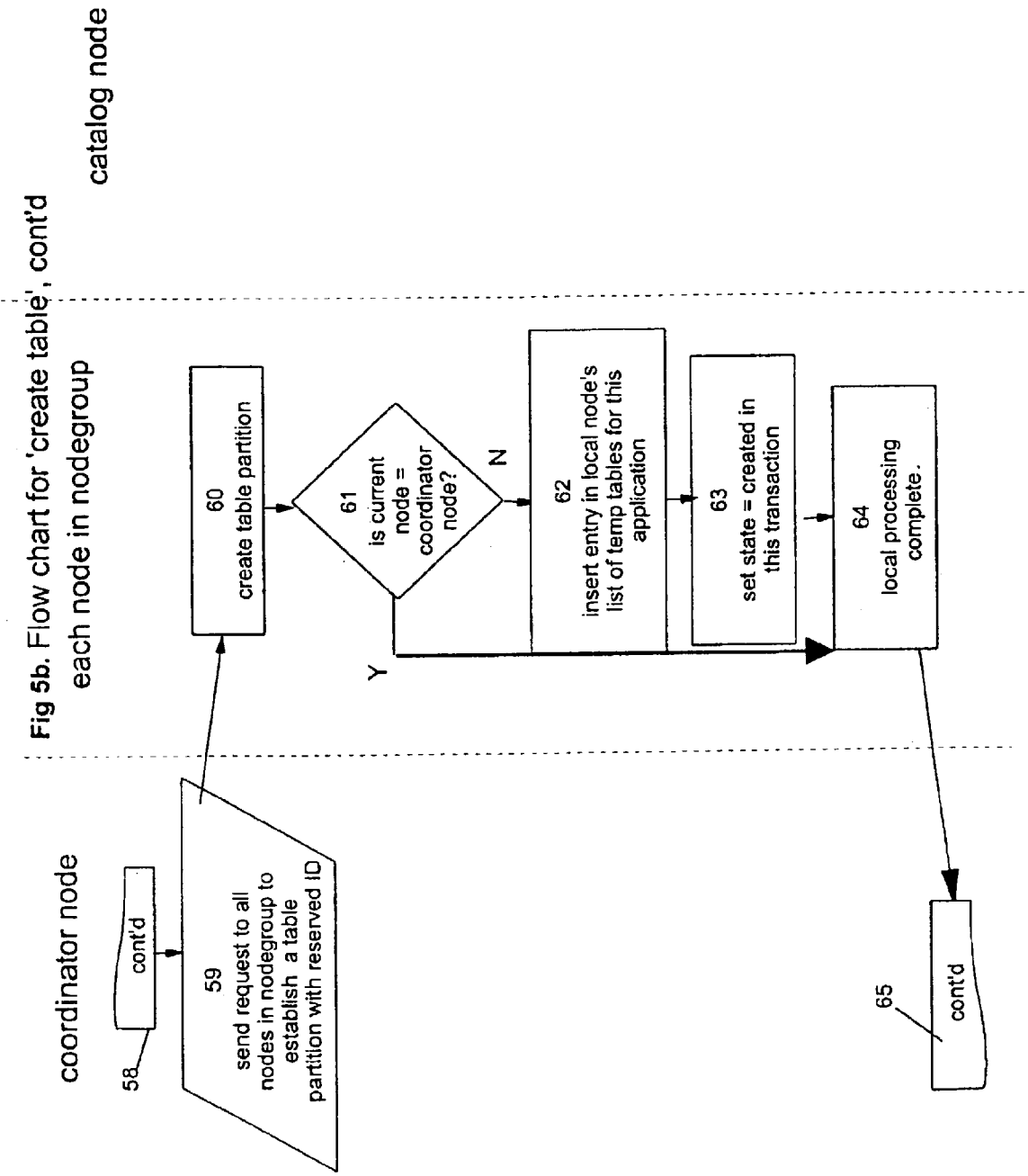

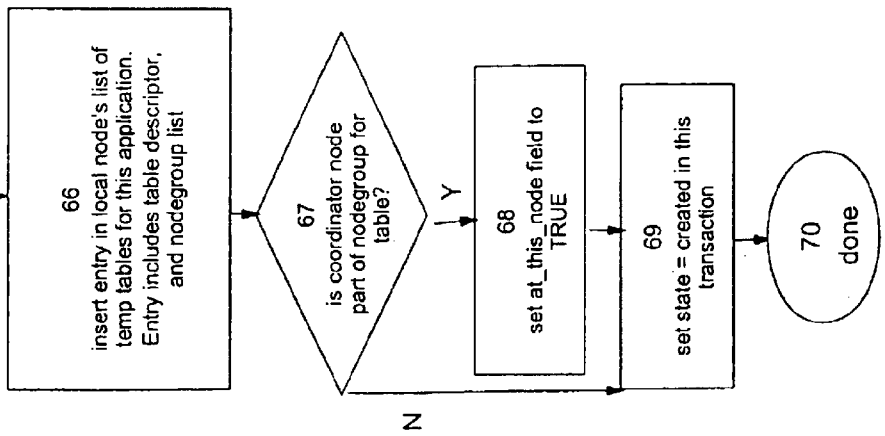
Fig 5c. Flow chart for 'create table', cont'd

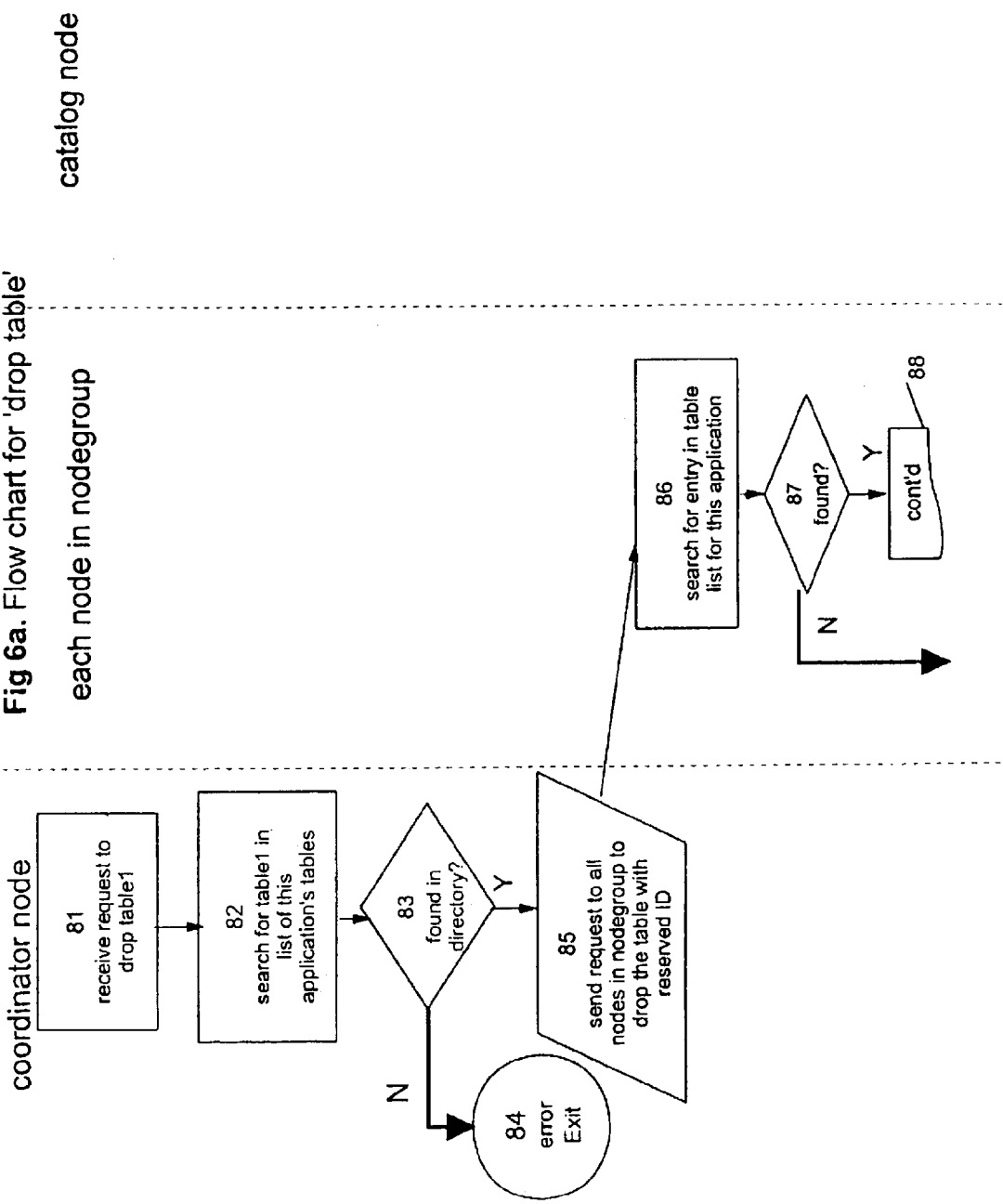
Fig 6a. Flow chart for 'drop table'

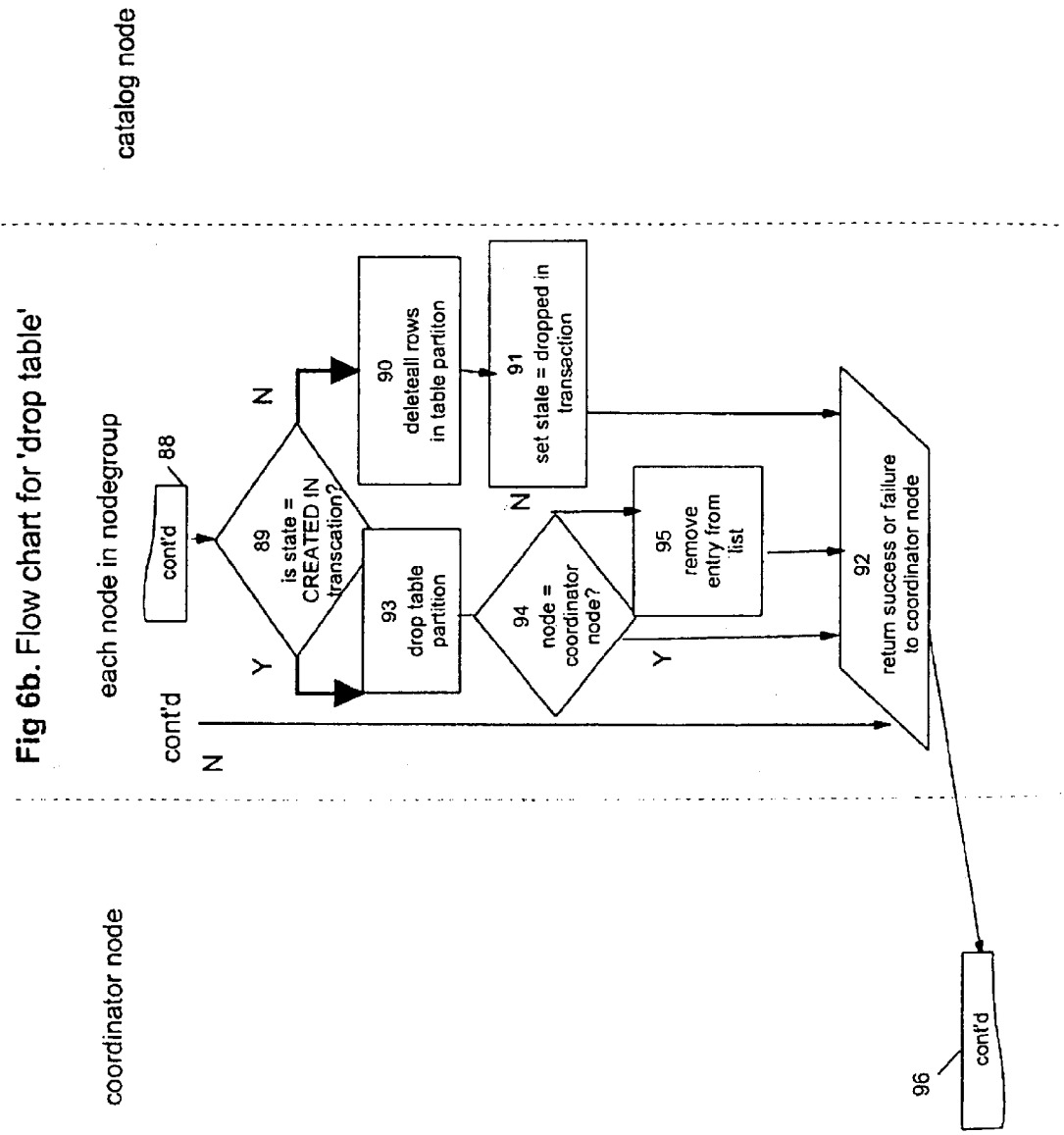
Fig 6b. Flow chart for 'drop table'

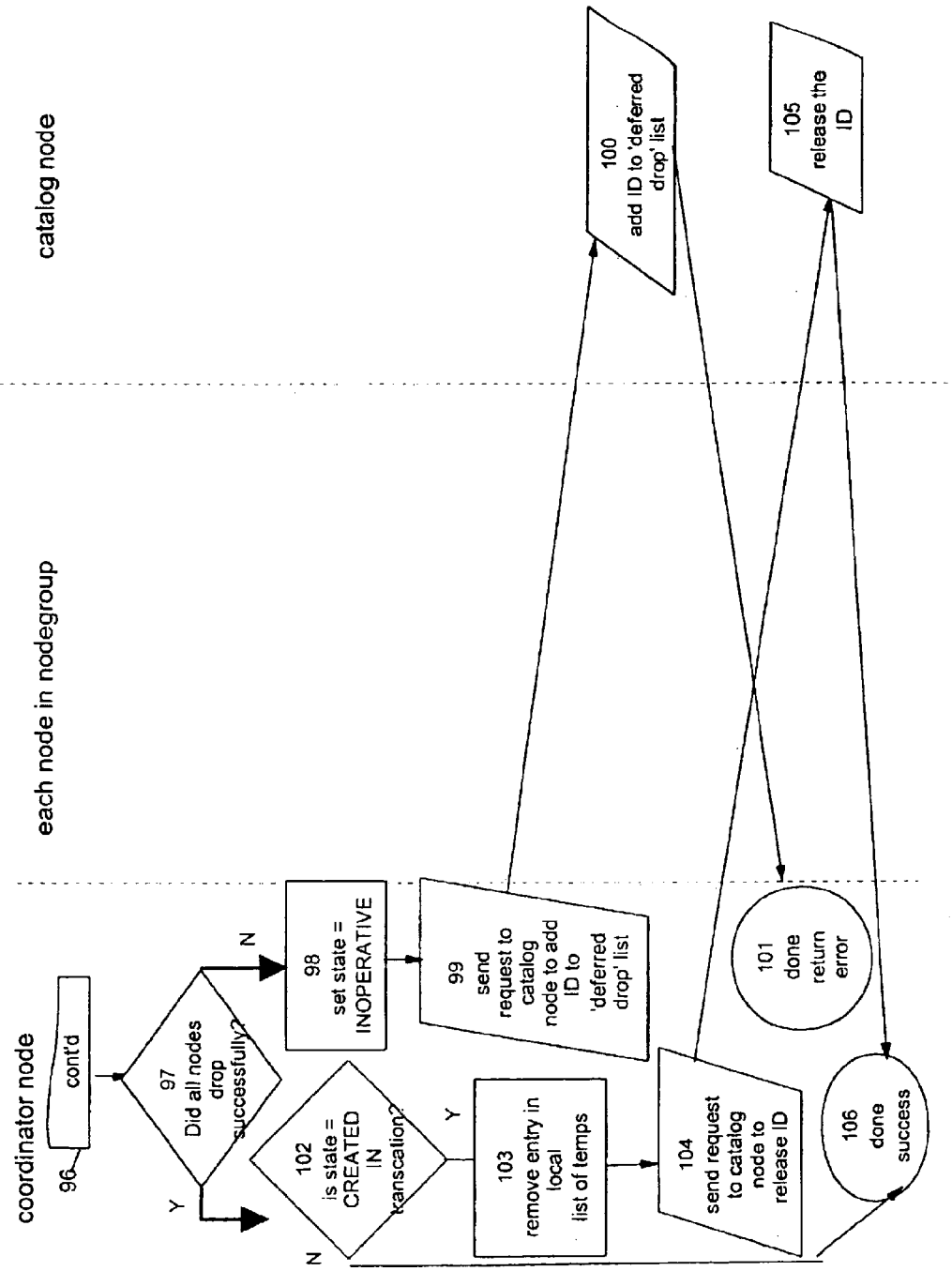
Fig 6c. Flow chart for 'drop table'

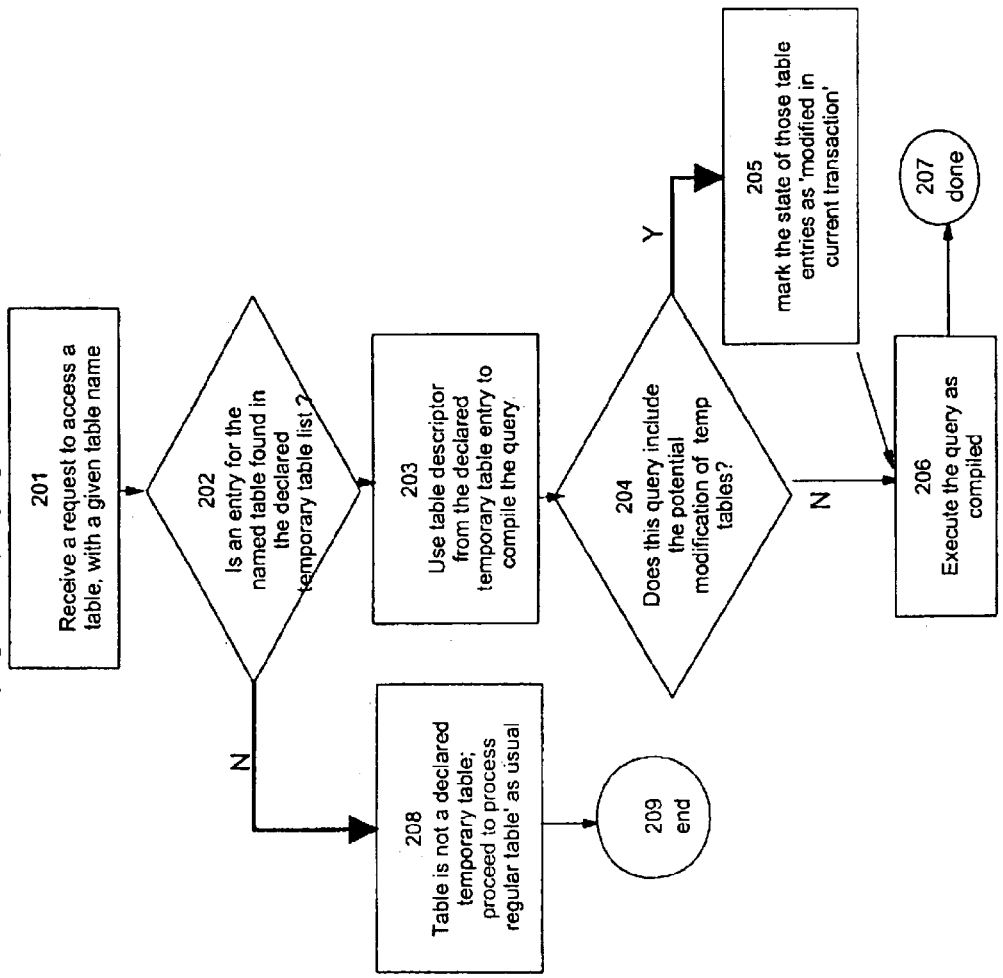
Fig. 7. Flow chart for carrying out a query against a declared temporary table

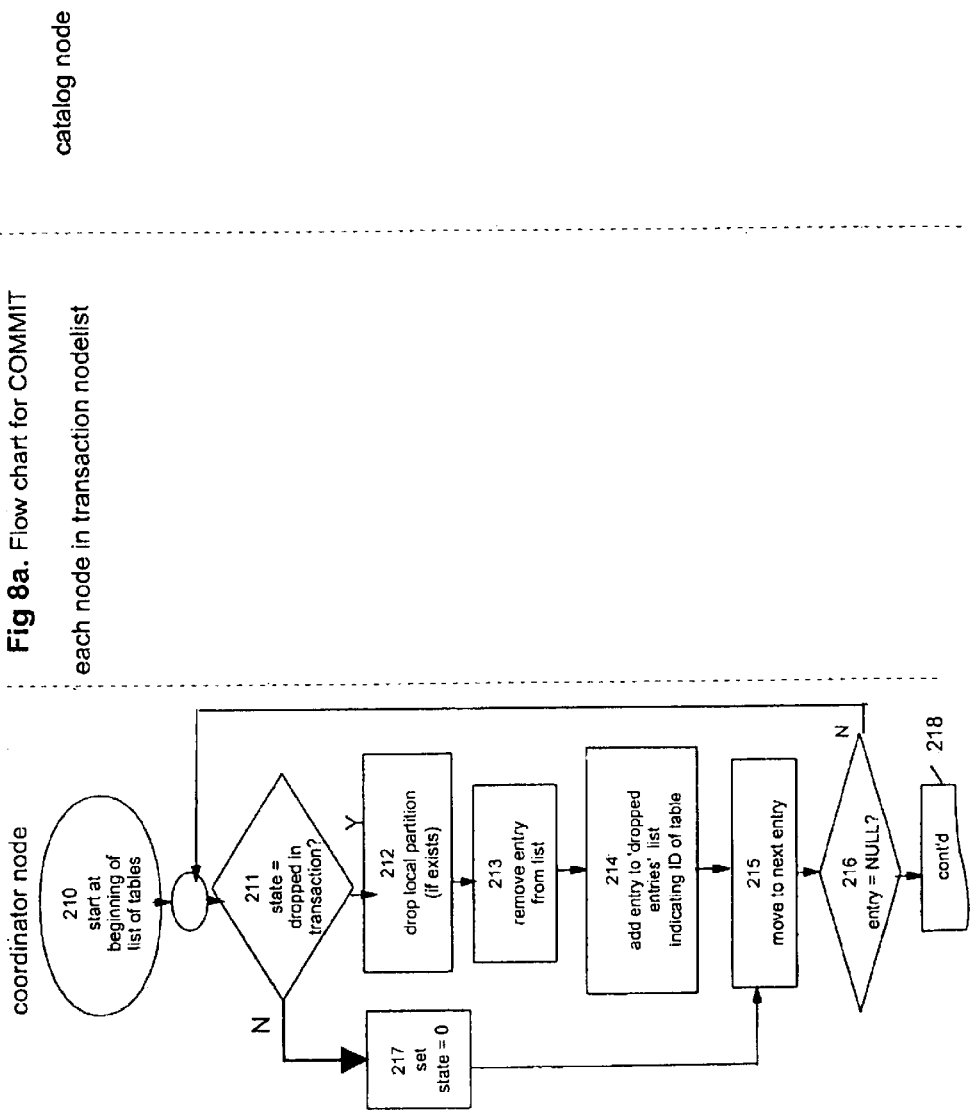
Fig 8a. Flow chart for COMMIT

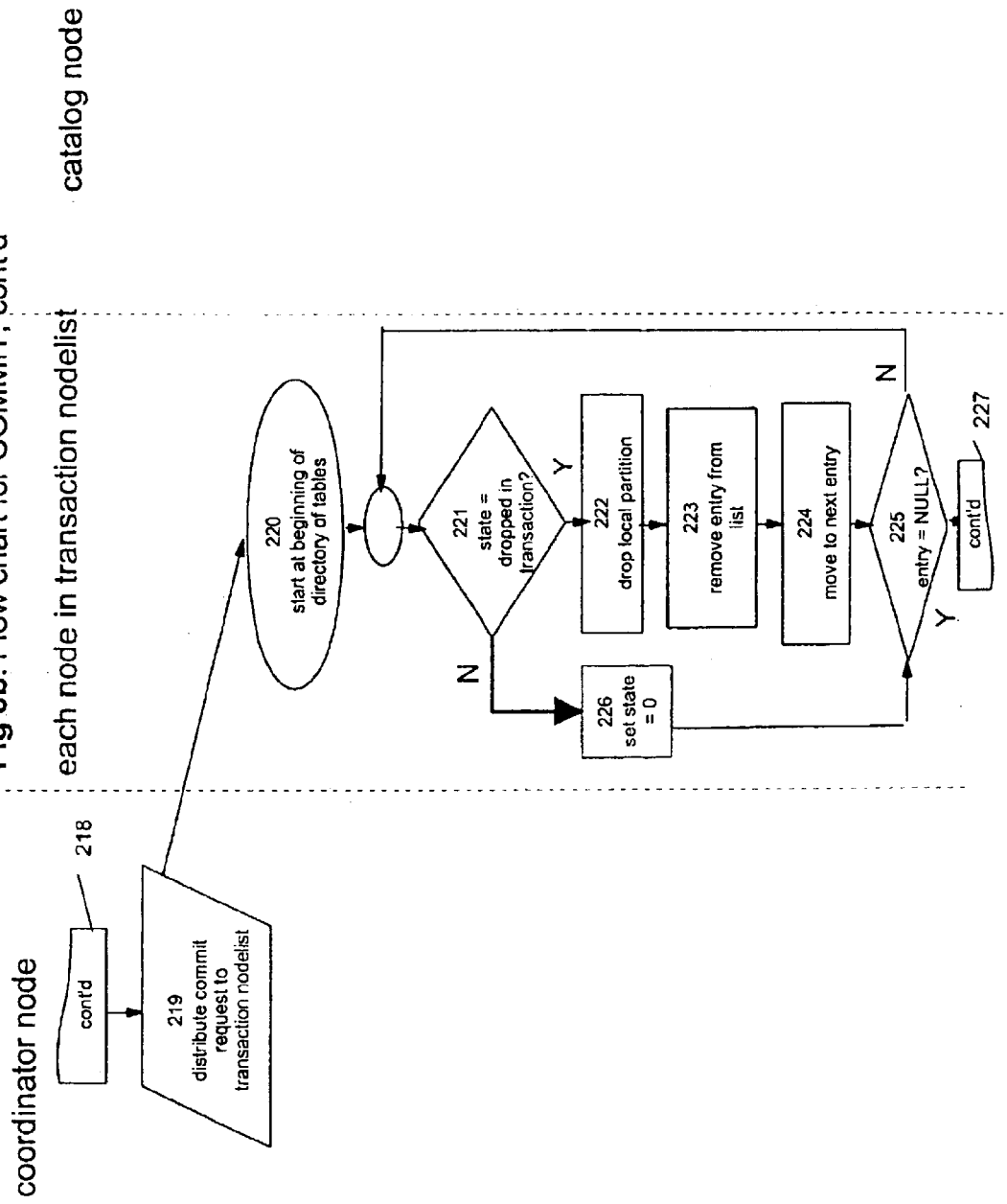

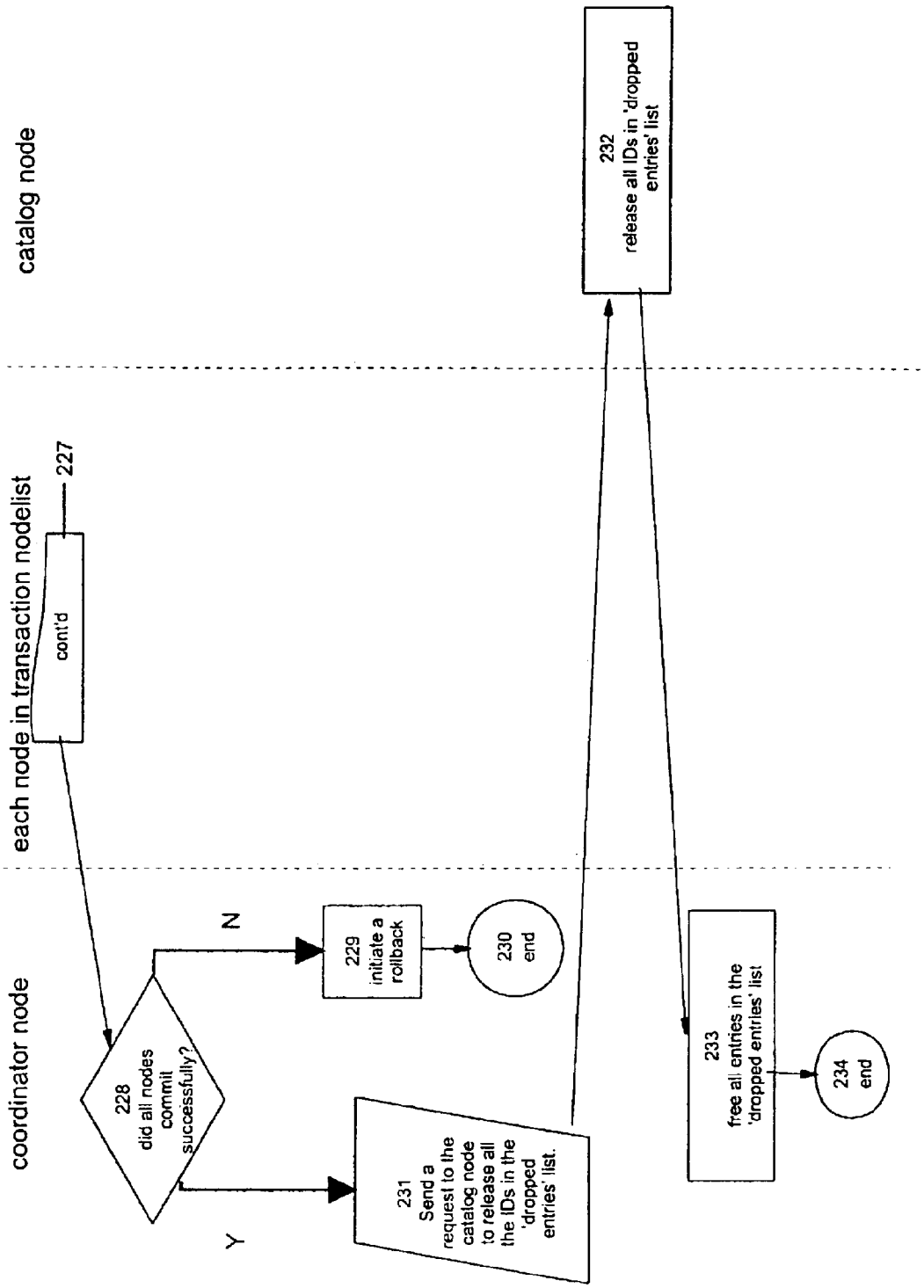

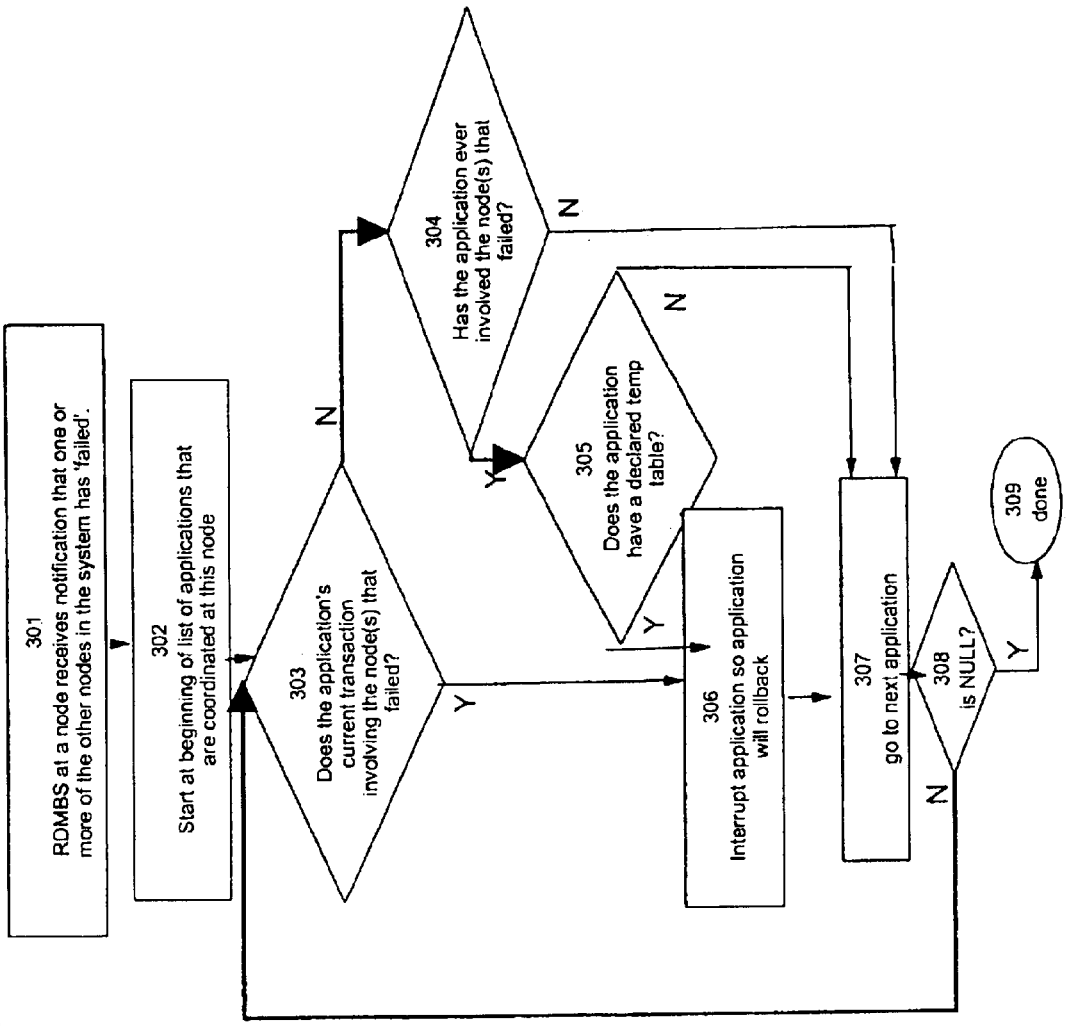
Fig. 9 - Modified processing of Node Failure for declared temporary tables

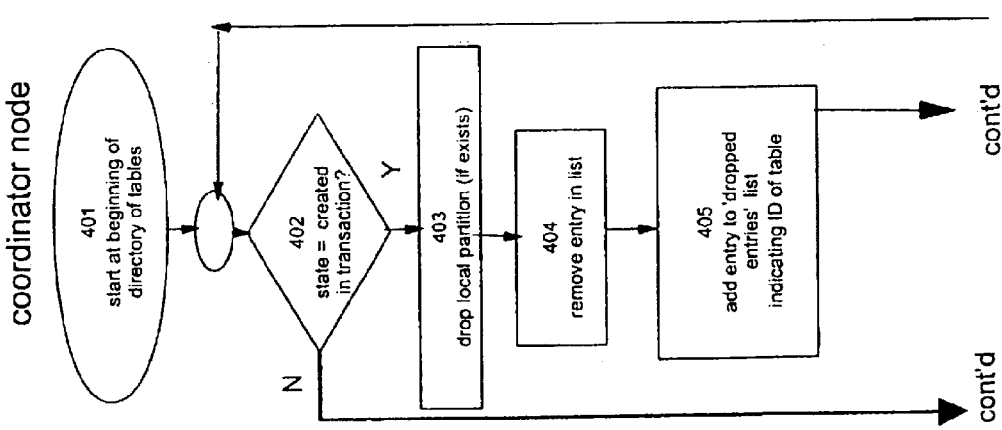
Fig 10a. Flow chart for ROLLBACK, cont'd

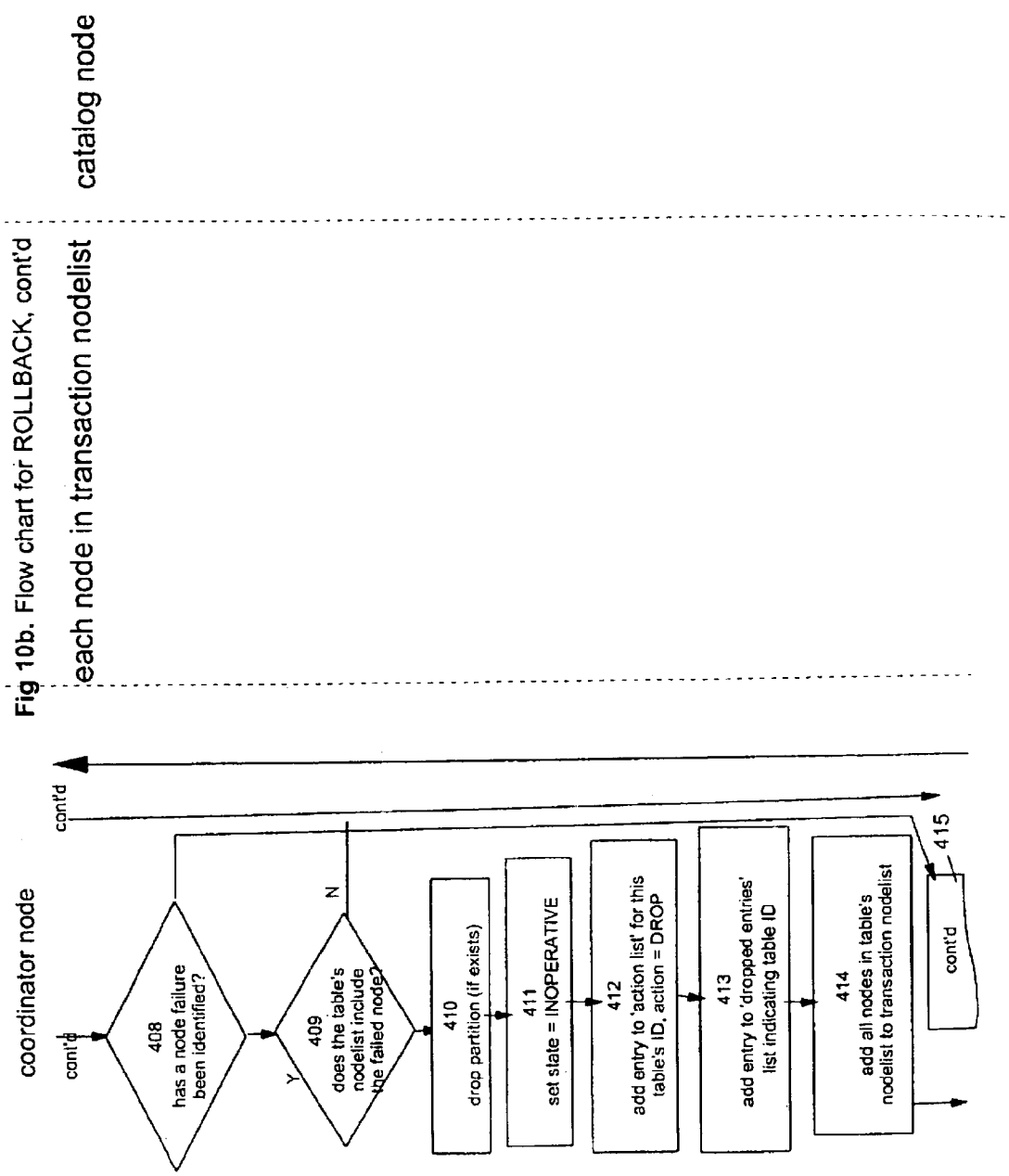
Fig 10b. Flow chart for ROLLBACK, cont'd

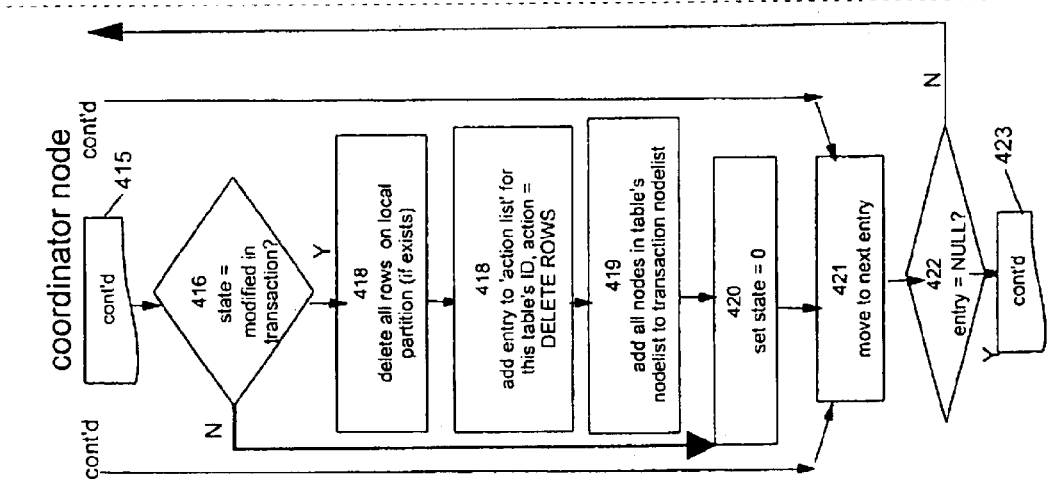
Fig 10c. Flow chart for ROLLBACK, cont'd each node in transaction nodelist

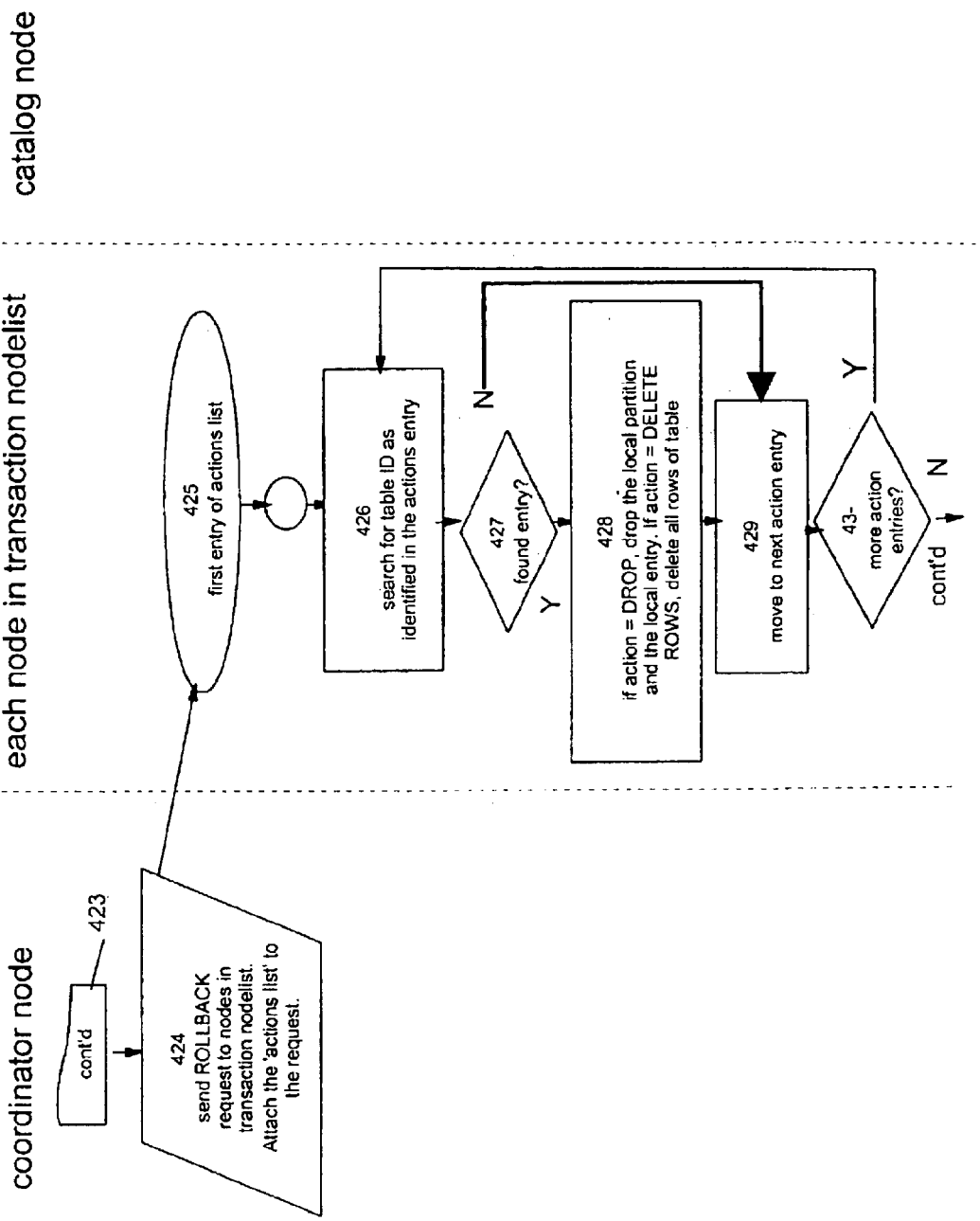
Fig 10d. Flow chart for ROLLBACK, cont'd

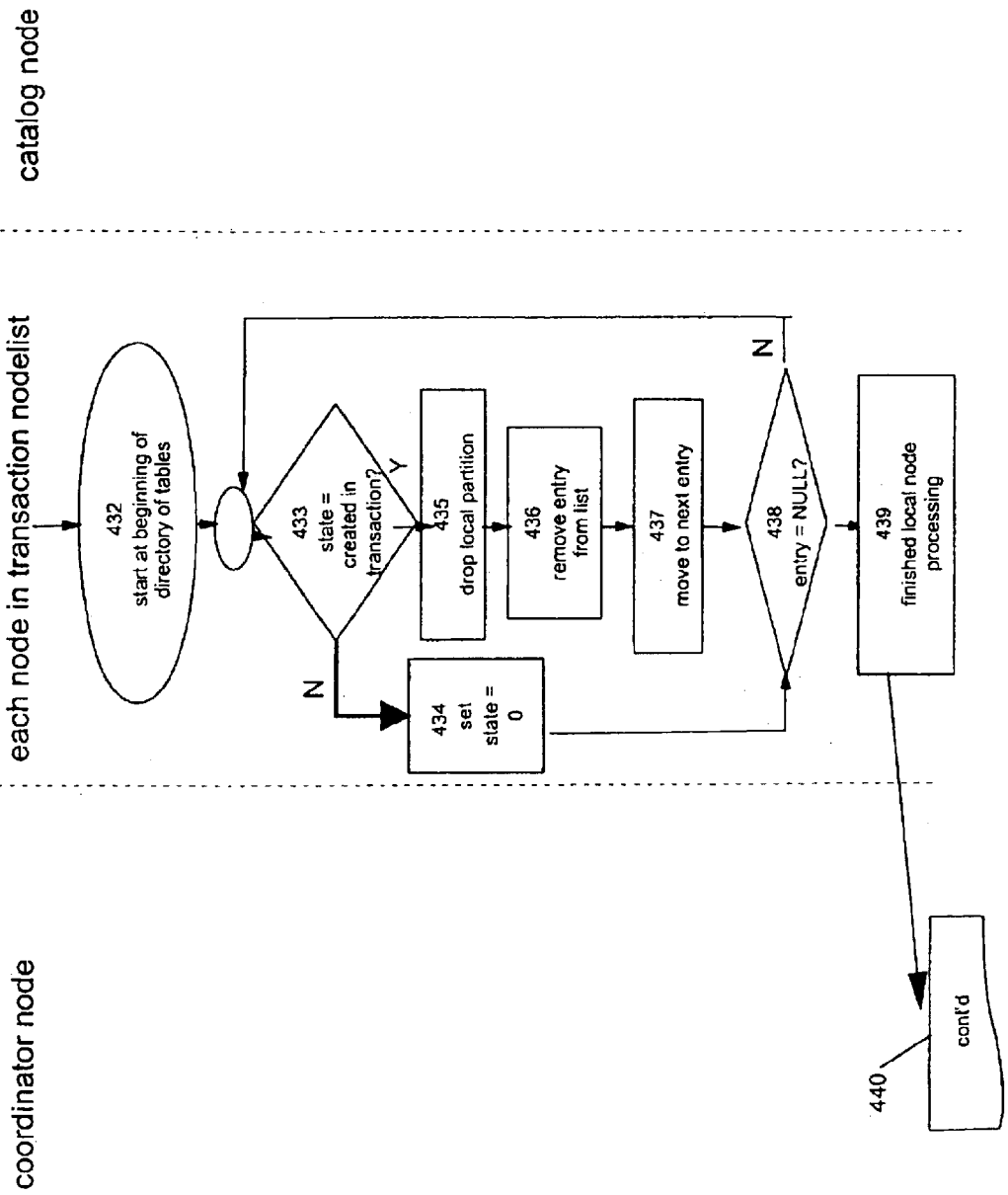
Fig 10e. Flow chart for ROLLBACK, cont'd

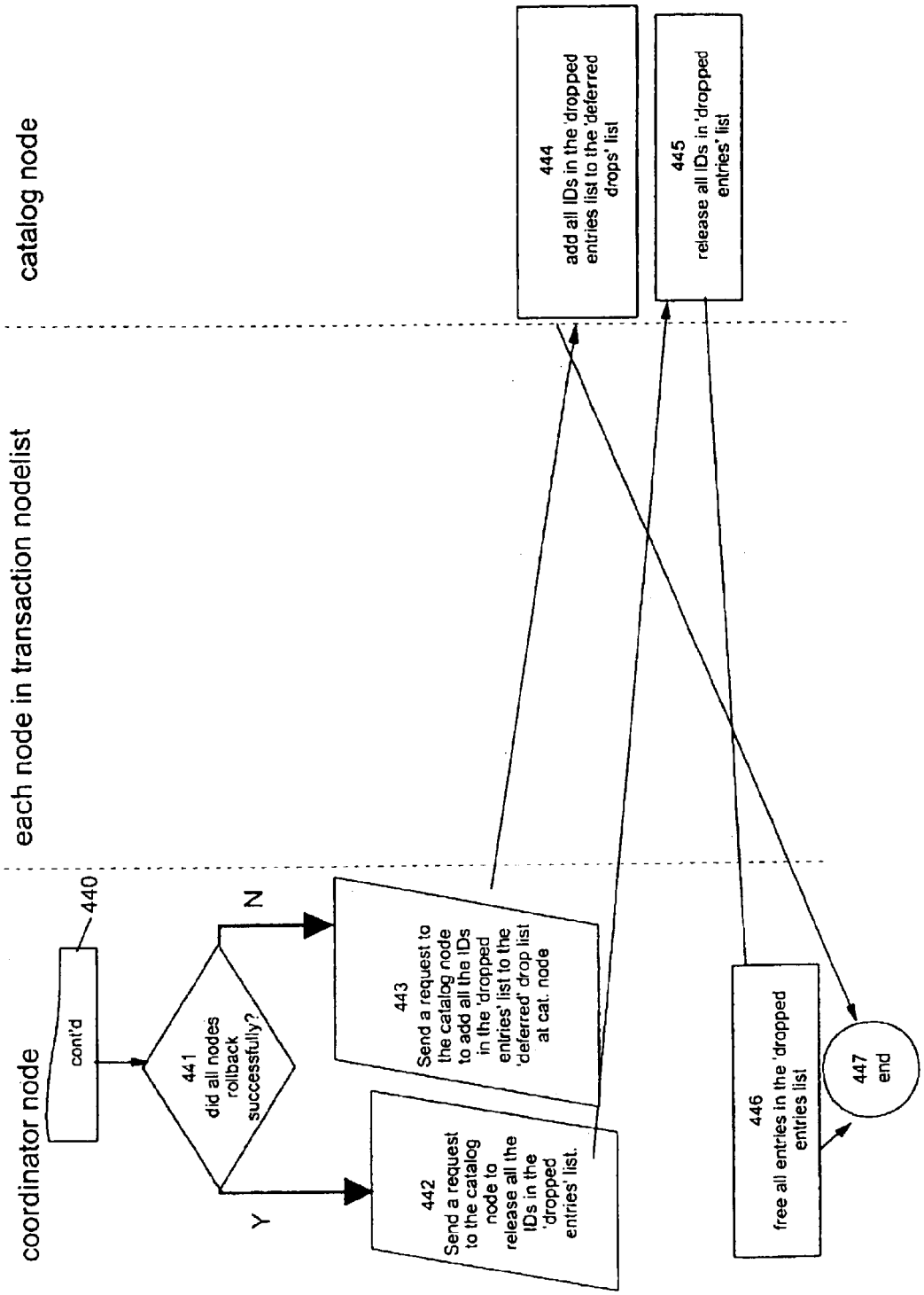

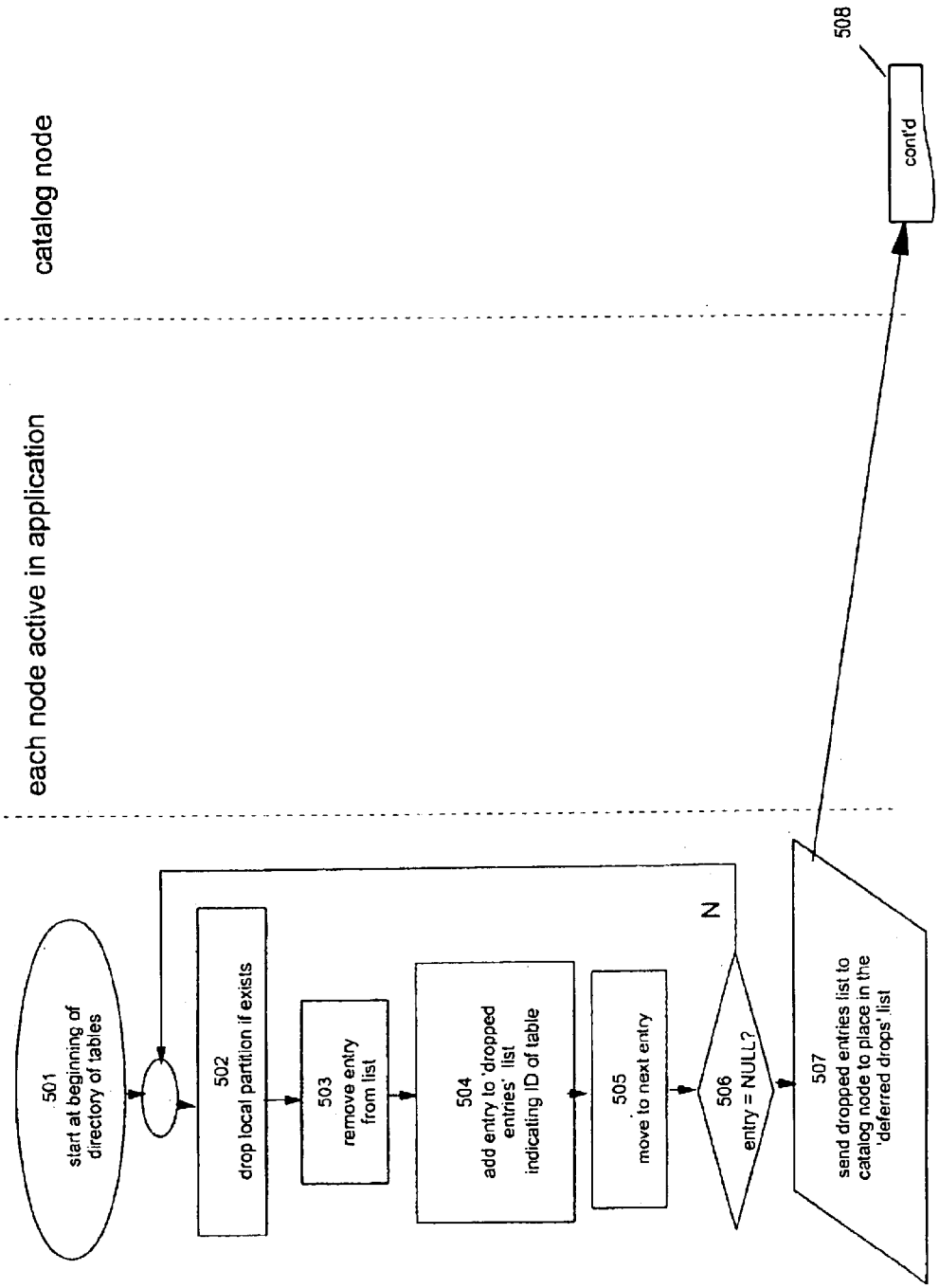
Fig 11a. Flow chart for application termination. Coordinator node is not catalog node

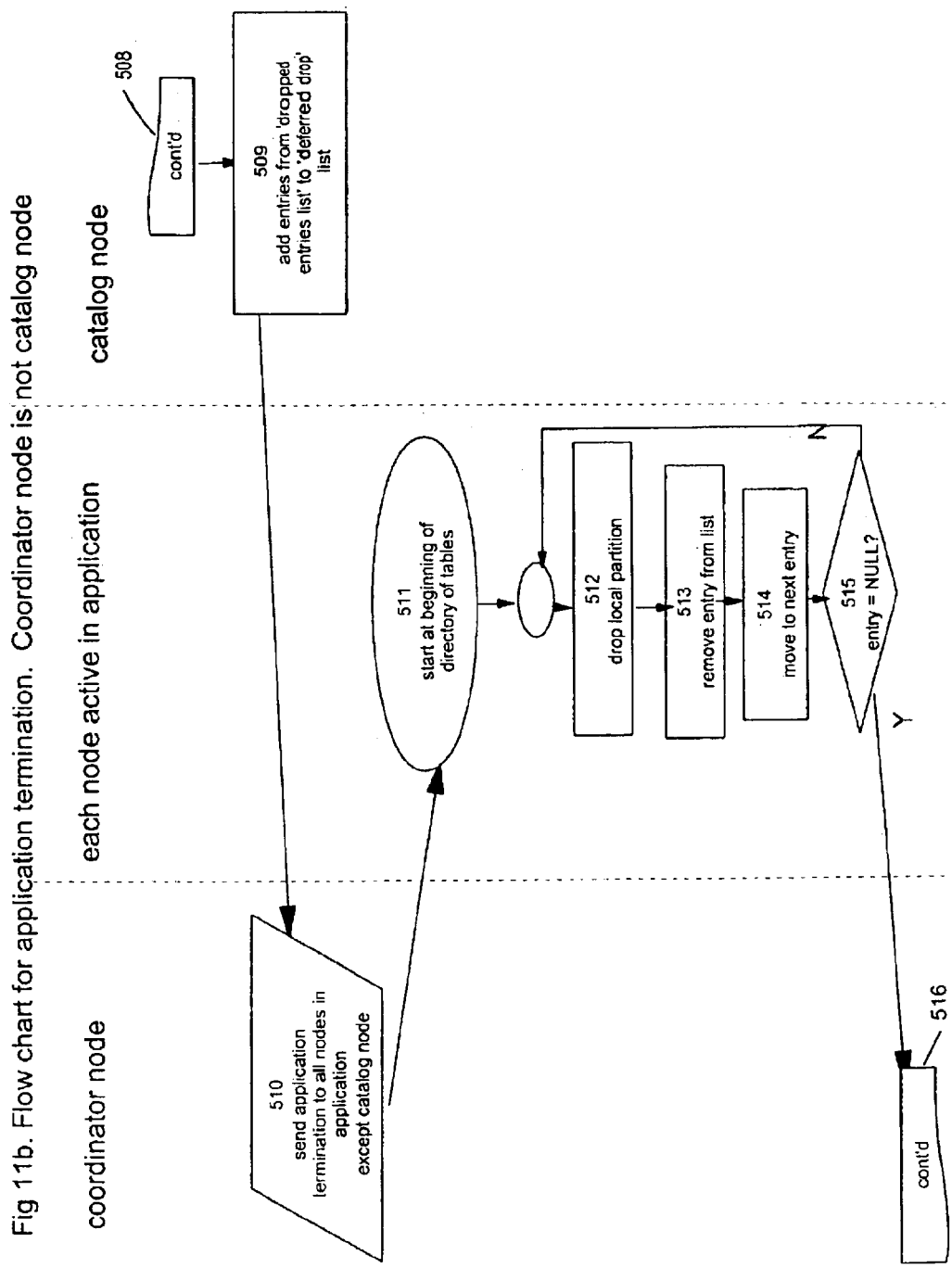
Fig 11b. Flow chart for application termination. Coordinator node is not catalog node

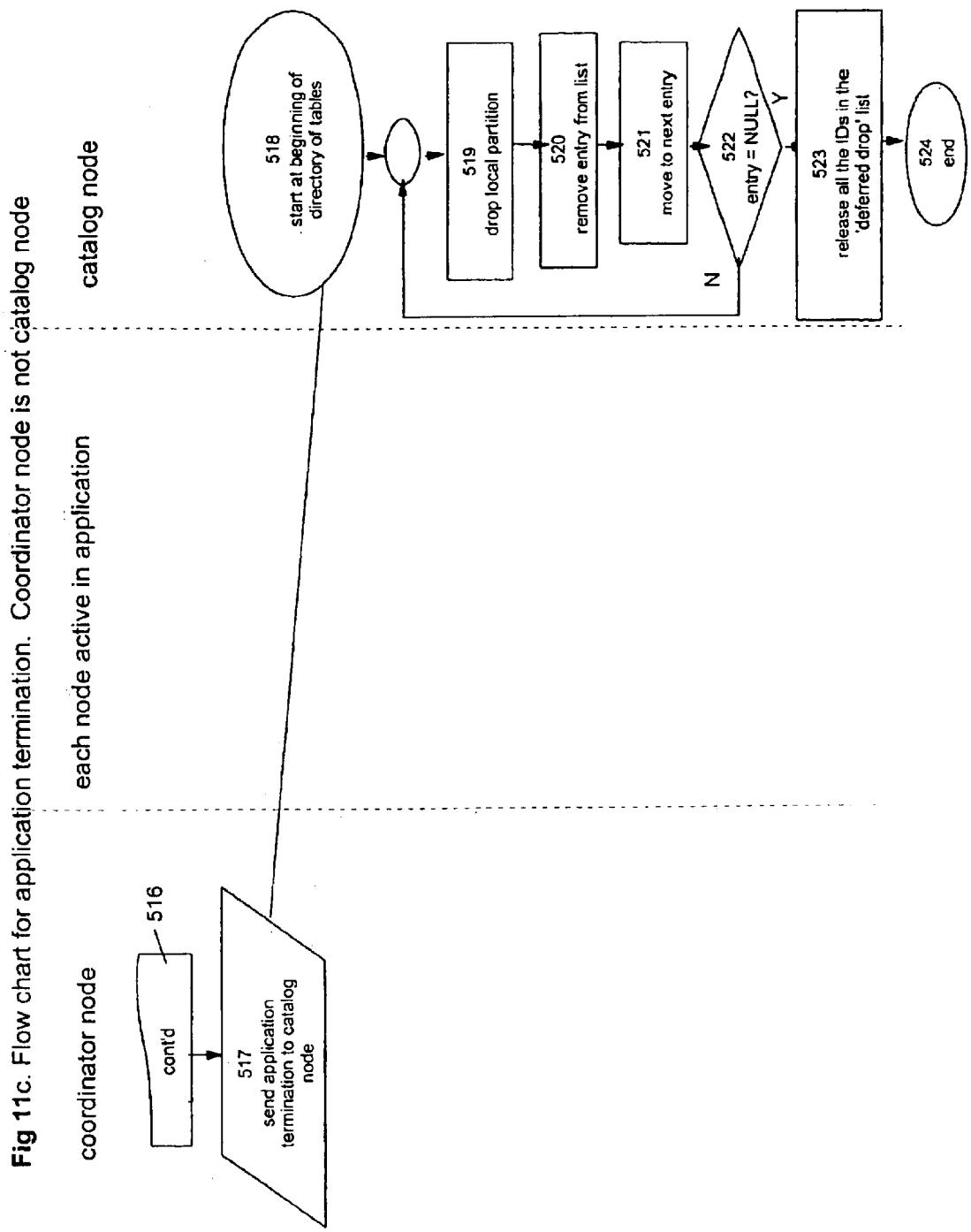
Fig 11c. Flow chart for application termination. Coordinator node is not catalog node

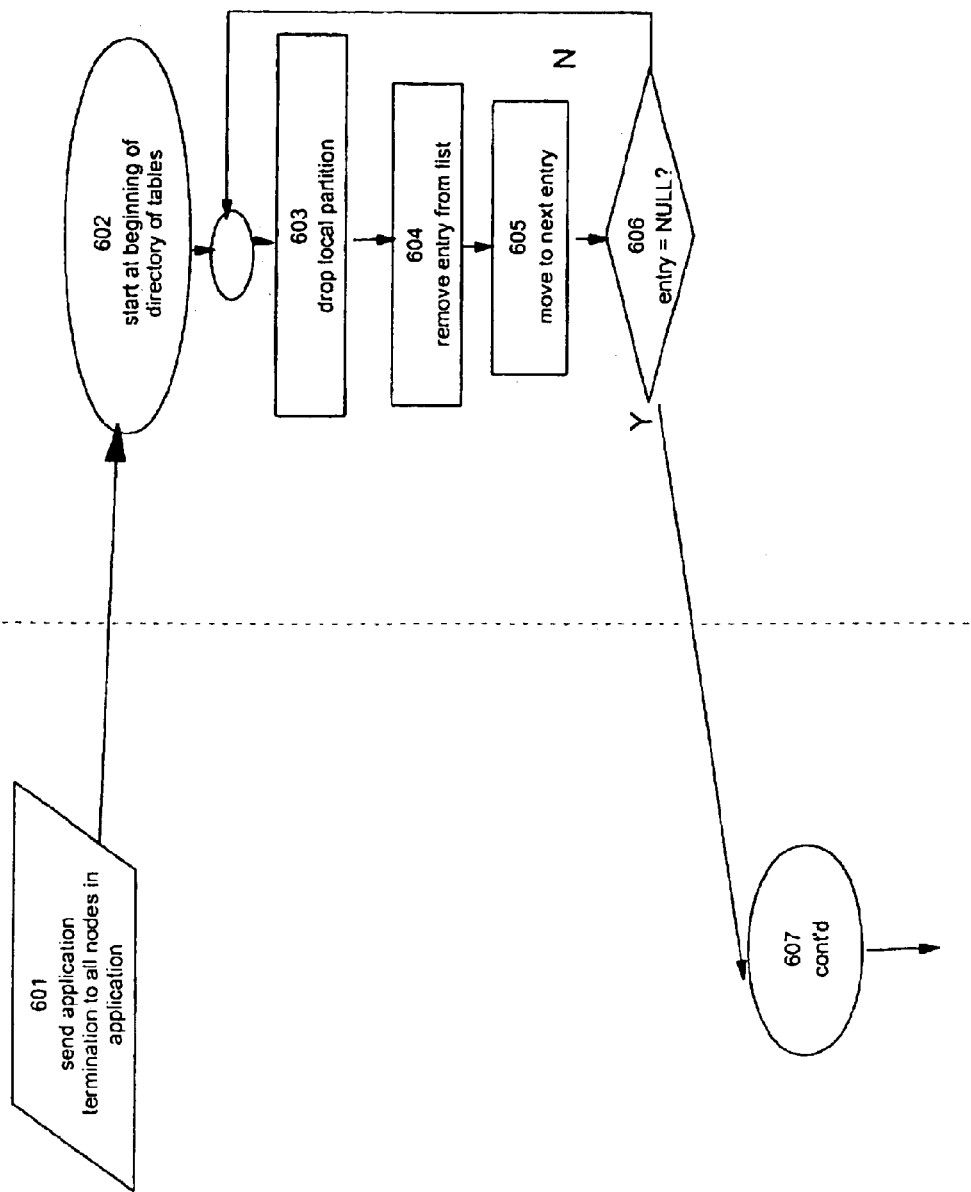
Fig 12a. Flow chart for application termination. Coordinator node is catalog node coordinator node = catalog node each node active in application

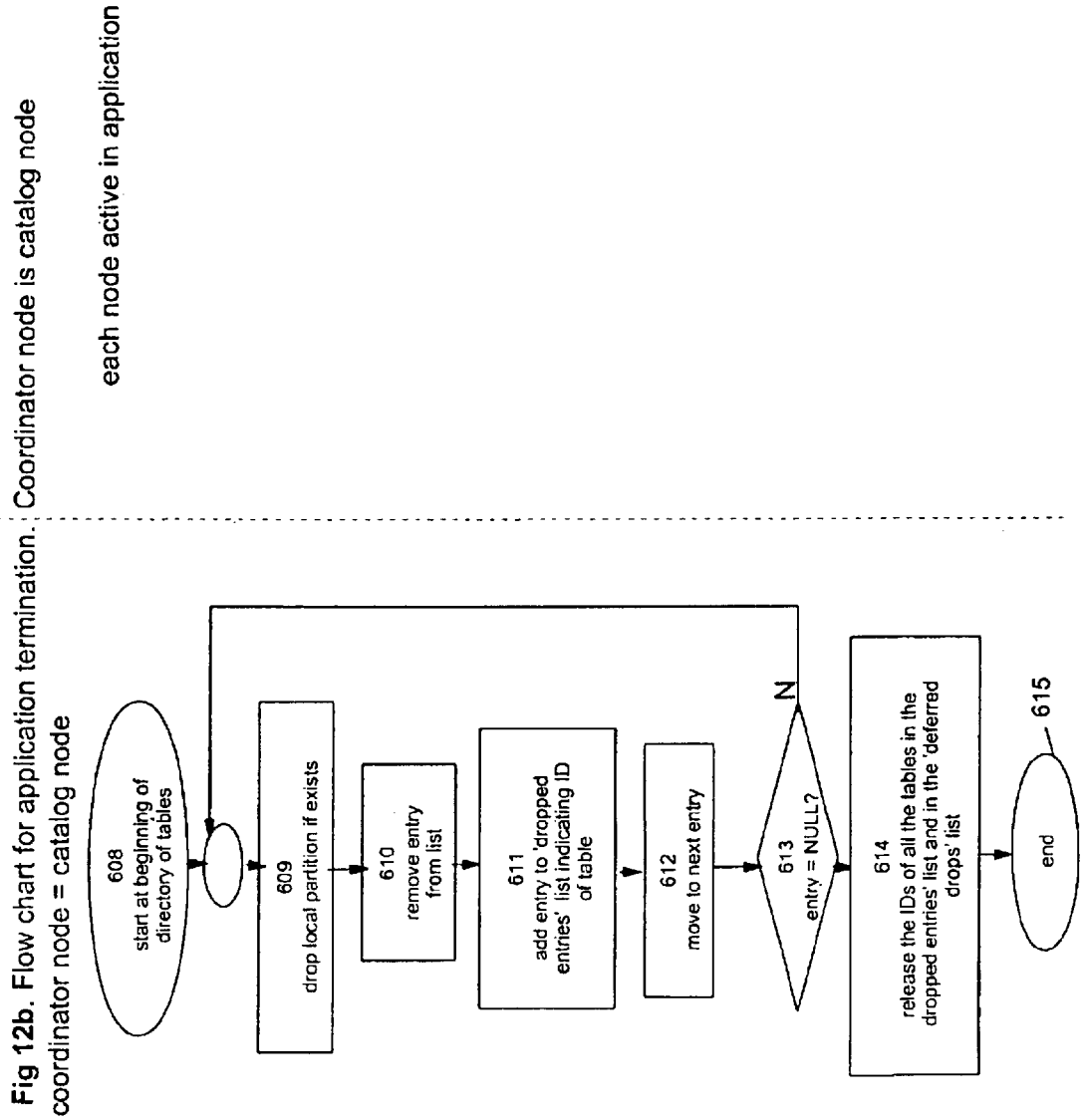
Fig 12b. Flow chart for application termination. Coordinator node is catalog node coordinator node = catalog node
each node active in application

METHOD AND APPARATUS FOR SYNCHRONIZING NOT-LOGGED APPLICATION TEMPORARY TABLES IN A MULTI-NODE RELATIONAL DATABASE MANAGEMENT SYSTEM

FIELD OF THE INVENTION

The present invention relates to the management of tables in a relational database management system.

BACKGROUND OF THE INVENTION

Relational Database Management Systems (RDBMS's) have a well-defined concept of a 'regular' table, which contains data that is accessible to multiple applications that have the appropriate authority to access the table, whose data integrity is maintained by concurrency control enforced by table and row level locking; recoverability and the possibility to 'undo work' is ensured by logging.

Another type of table (application-temporary) has been introduced by a number of RDBMS products that has a more restricted scope. These 'application-temporary' tables are created for the use of the application that created them only and cease to exist once the application disconnects from the database. This type of table need not use locking to ensure concurrency control since there is only one application accessing the table at once. This table type allows application writers to create applications that utilize tables that are guaranteed to be inaccessible to all other users of the database as well as having the performance benefit of not having locking to slow them.

An additional performance benefit can be had by (optionally) eliminating the logging of changes to application-temporary tables. The absence of logging means that changes made to an application-temporary table cannot be undone (rolled back) as is done with logged tables. Nonetheless, since the table is under the sole control of the application that created it, then the need to roll back changes may not be as necessary as with other tables, so an application writer may determine that the performance benefits of having application-tables not logged are of sufficient benefit to not require the rollback capabilities of this table.

Also, in order to have temporary tables be used to maximum benefit in a multi-node RDBMS, it is advantageous to be able to partition application-temporary tables across multiple nodes. This allows for larger temporary tables as well as the possibility of 'collocation' of data in the temporary tables with that of 'regular' tables (i.e., the data in the temporary table is partitioned in the same manner as the regular table). The performance of queries issued against tables that are collocated with each other can be greatly optimized.

However in order to implement partitioned not-logged application-temporary tables, there are a number of hurdles that must be overcome that ensure that changes made to the table are properly synchronized at all nodes. Since logging is usually the mechanism that ensures that changes to regular table are properly synchronized at all nodes, a new mechanism is needed to manage these application-temporary tables.

The invention herein provides a method and apparatus, described below, to implement partitioned not-logged application temporary tables in a manner that minimizes network traffic needed to coordinate these tables.

SUMMARY OF THE INVENTION

One aspect of the invention provides a multi-node relational database management system for managing a database having declared temporary tables associated with respective applications, comprising:
a plurality of nodes, comprising:
a catalog node for maintaining a list of identifiers for declared temporary tables associated with any application;
a coordinator node for an application
at least one subordinate node for the application;
a declared temporary table manager for causing:
a) the coordinator node to maintain for the application:
a list of the declared temporary tables.

Another aspect of the invention herein provides a multi-node relational database management system for managing a database having declared temporary tables associated with respective applications, and logged tables, comprising:
a plurality of nodes, including:
a catalog node for maintaining a list of identifiers for declared temporary tables associated with any application;
a coordinator node for an application;
at least one subordinate node for the application, the subordinate node having at least one partition of the declared temporary tables of the application;
a declared temporary table manager for causing:
a) the coordinator node to maintain for the application:
a list of the declared temporary tables;
a list of the declared temporary tables being dropped;
a list of action entries indicating identification of tables on which actions are to be performed, and actions to be performed;
a transaction node list indicating identification of those nodes involved in a current transaction; and,
an application node list for indicating identification of all nodes that have participated in execution of the application; and,
b) the subordinate node for the application to maintain a list of the declared temporary tables that are partitioned at the subordinate node.

Some aspects of this invention also apply to a multi-node environment for which there is only one partition for the declared temporary table and that partition is on the coordinator node.

Yet another aspect of the invention herein provides a multi-node relational database management system for managing a database having declared temporary tables associated with an application, and logged tables, comprising:
a plurality of nodes, including:
a catalog node for maintaining a list of identifiers for declared temporary tables associated with any application, and a deferred drop list;
a coordinator node for an application;
at least one subordinate node for the application, the subordinate node having at least one partition of the declared temporary tables of the application;
a declared temporary table manager for managing the declared temporary tables for causing:
a) the coordinator node to maintain for the application:
a list of the declared temporary tables for tracking the temporary tables;
a list of the declared temporary tables being dropped containing information to be sent to the catalog node to inform it of declared temporary tables being dropped so the catalog node can release the identification of the declared temporary tables being dropped or add the identification to its deferred drop list to release the identification when execution of the application ends;

a list of action entries indicating identification of tables on which actions are to be performed, and any actions to be performed to be used to inform subordinate nodes to maintain their partitions of the declared temporary tables in synchronization;

a transaction node list indicating identification of those nodes involved in a current transaction to inform the subordinate nodes involved in the current transaction to appropriately end a transaction as required for rollback or commit; and, an application node list for indicating identification of all nodes that have participated in execution of the application, to identify all subordinate nodes participating in the application so that they can perform node specific application termination processing including cleanup;

b) the subordinate node for the application to maintain a list of the declared temporary tables that are partitioned at the subordinate node for synchronization.

Optionally the coordinator node for an application is located at the catalog node; at least one subordinate node for an application can be at any node except that application's coordinator node.

Another aspect of the invention provides a program product comprising a computer readable storage medium for storing instructions to establish a multi-node relational database management system for managing a database having declared temporary tables associated with respective applications, comprising:

a plurality of nodes, including:
program instructions for establishing a catalog node for maintaining a list of identifiers for declared temporary tables associated with any application;
program instructions for establishing a coordinator node for an application;
program instructions for establishing at least one subordinate node for the application, the subordinate node having at least one partition of the declared temporary tables of the application; and,
program instructions for establishing a declared temporary table manager for causing:
a) the coordinator node to maintain for the application:
a list of the declared temporary tables.

The program product may further include program instructions for establishing the declared temporary table manager for causing:

a) the coordinator node to maintain for the application:
a list of the declared temporary tables;
a list of the declared temporary tables being dropped;
a list of action entries indicating identification of tables on which actions are to be performed, and actions to be performed;
a transaction node list indicating identification of those nodes involved in a current transaction; and,
an application node list for indicating identification of all nodes that have participated in execution of the application; and, b) the subordinate node for the application to maintain a list of the declared temporary tables that are partitioned at the subordinate node.

Yet another aspect of the invention provides a program product comprising a computer readable storage medium for storing instructions to establish a multi-node relational database management system for managing a database having declared temporary tables associated with respective applications, and logged tables, comprising:

a plurality of nodes, including:
a node failure list identifying nodes that have failed;
program instructions for establishing a catalog node for maintaining a list of identifiers for declared temporary tables associated with any application;
program instructions for establishing a coordinator node for an application;
program instructions for establishing at least one subordinate node for the application, the subordinate node having at least one partition of the declared temporary tables of the application;
program instructions for establishing a declared temporary table manager for causing:
a) the coordinator node to maintain for the application:
a list of the declared temporary tables;
a list of the declared temporary tables being dropped;
a list of action entries indicating identification of tables on which actions are to be performed, and actions to be performed;
a transaction node list indicating identification of those nodes involved in a current transaction; and,
an application node list for indicating identification of all nodes that have participated in execution of the application; and,
b) the subordinate node for the application to maintain a list of the declared temporary tables that are partitioned at the subordinate node.

Still another aspect of the invention provides a program product comprising a computer readable storage medium for storing instructions to establish a multi-node relational database management system for managing a database having declared temporary tables associated with an application, and logged tables, comprising:

a plurality of nodes, including:
program instructions for establishing a catalog node for maintaining a list of identifiers for declared temporary tables associated with any application, and a deferred drop list;
program instructions for establishing a coordinator node for an application;
program instructions for establishing at least one subordinate node for the application, the subordinate node having at least one partition of the declared temporary tables of the application;
program instructions for establishing a declared temporary table manager for managing the declared temporary tables for causing:
a) the coordinator node to maintain for the application:
a list of the declared temporary tables for tracking the temporary tables;
a list of the declared temporary tables being dropped containing information to be sent to the catalog node to inform it of declared temporary tables being dropped so the catalog node can release the identification of the declared temporary tables being dropped or add the identification to its deferred drop list to release the identification when execution of the application ends;
a list of action entries indicating identification of tables on which actions are to be performed, and any actions to be performed to be used to inform subordinate nodes to maintain their partitions of the declared temporary tables in synchronization;

a transaction node list indicating identification of those nodes involved in a current transaction to inform the subordinate nodes involved in the current transaction to appropriately end a transaction as required for rollback or commit; and, an application node list for indicating identification of all nodes that have participated in execution of the application, to identify all subordinate nodes participating in the application so that they can perform node specific application termination processing including cleanup;

b) the subordinate node for the application to maintain a list of the declared temporary tables that are partitioned at the subordinate node for synchronization.

Another aspect of the invention provides, in a multi-node relational database management system a method for managing a database having declared temporary tables associated with respective applications, comprising:

a plurality of nodes, including:

using a catalog node for maintaining a list of identifiers for declared temporary tables associated with any application;

associating a coordinator node for an application;

using at least one subordinate node for the application, the subordinate node having at least one partition of the declared temporary tables of the application; and, using a declared temporary table manager for causing:

a) the coordinator node to maintain for the application:

a list of the declared temporary tables.

Still another aspect of the invention provides, in a multi-node relational database management system, a method for managing a database having declared temporary tables associated with respective applications, and logged tables, having a plurality of nodes, comprising:

using a catalog node for maintaining a list of identifiers for declared temporary tables associated with any application;

associating a coordinator node for an application;

using at least one subordinate node for the application, the subordinate node having at least one partition of the declared temporary tables of the application;

using a declared temporary table manager for causing:

a) the coordinator node to maintain for the application:

a list of the declared temporary tables;

a list of the declared temporary tables being dropped;

a list of action entries indicating identification of tables on which actions are to be performed, and actions to be performed;

a transaction node list indicating identification of those nodes involved in a current transaction; and, an application node list for indicating identification of all nodes that have participated in execution of the application; and, b) the subordinate node for the application to maintain a list of the declared temporary tables that are partitioned at the subordinate node.

Yet another aspect of the invention provides, in a multi-node relational database management system, a method for managing a database having declared temporary tables associated with an application, and logged tables, comprising:

a plurality of nodes, including:

using a catalog node for maintaining a list of identifiers for declared temporary tables associated with any application, and a deferred drop list;

using a coordinator node for an application;

using at least one subordinate node for the application, the subordinate node having at least one partition of the declared temporary tables of the application;

using a declared temporary table manager for managing the declared temporary tables for causing:

a) the coordinator node to maintain for the application:

a list of the declared temporary tables for tracking the temporary tables;

a list of the declared temporary tables being dropped containing information to be sent to the catalog node to inform it of declared temporary tables being dropped so the catalog node can release the identification of the declared temporary tables being dropped or add the identification to its deferred drop list to release the identification when execution of the application ends;

a list of action entries indicating identification of tables on which actions are to be performed, and any actions to be performed to be used to inform subordinate nodes to maintain their partitions of the declared temporary tables in synchronization;

a transaction node list indicating identification of those nodes involved in a current transaction to inform the subordinate nodes involved in the current transaction to appropriately end a transaction as required for rollback or commit; and, an application node list for indicating identification of all nodes that have participated in execution of the application, to identify all subordinate nodes participating in the application so that they can perform node specific termination processing including cleanup;

b) the subordinate node for the application to maintain a list of the declared temporary tables that are partitioned at the subordinate node for synchronization.

Preliminary Terminology

As in other fields of technology it is possible that different terminology is used to describe the same concept or structure. In this specification terminology from IBM database products such as the DB2 relational database management system will be used for the purpose of consistency.

Declared temporary table. In this specification an application-temporary table is called a 'declared temporary table'.

Coordinator node and subordinate nodes. In a multi-node system an application is connected to a database at a specific node; that node is called the coordinator node; all other nodes in the system that have some activity on them on behalf of that application are known as subordinate nodes. At the coordinator node, the RDBMS engine dispatches an 'agent' to work specifically for the application. This agent is known as the coordinator agent. Other agents working on behalf of that application, whether it be on the same node as the coordinator agent or on the subordinate nodes are known as subordinate agents.

The catalog node is the one node of the database in which system catalogs are maintained. In a well known RDBMS if the catalog node fails, the operation of the database is stopped on all nodes.

In order for the RDBMS to distinguish between different tables, each table is identified by a unique identifier, or id. If the table is partitioned on multiple nodes, then the same identifier is used to identify the table on each of nodes of the partition. Once a table has been dropped, the identifier used for that table is available to be used for other tables that are created thereafter. The identifier may be a tablespace id, file id combination.

A transaction or unit of work, is a grouping of statements issued by an application that is meant to be processed in a consistent unit. That is an application may commit a transaction, meaning that all changes made in the transaction are made 'permanent' in the database; a rollback of the transaction undoes all the changes made in the transaction.

Defined Behaviour for not Logged Declared Temporary Tables

If a declared temporary is to be not logged, then the behaviour of these tables whenever a rollback is issued is inherently different that that of 'regular' tables, and requires specific definition:

- if a declared temporary table was created and a rollback of the transaction occurs, the declared temporary table is dropped. This is the same behaviour as with regular tables.
- if a declared temporary table was dropped in a transaction and a rollback occurs, the declared temporary table will exist, but will be empty of all rows.
- if a declared temporary table was not modified in a transaction and the transaction is rolled back, then the table remains as is, with all data therein intact. This is the same behaviour as with regular tables.
- if an attempt to modify (via an insert/update/delete) the contents of a declared temporary table is made in the context of a transaction and the transaction is rolled back, then all rows of that declared temporary table (on all partitions) will be deleted. This rollback behaviour for NOT LOGGED tables is chosen so that a rollback will not leave a table in a confusing state in which it is populated with both rows from a previously committed transaction as well as rows from the transaction that was rolled back. Knowing that all rows are deleted, allows the application to handle this table in a consistent and straightforward manner by starting with the table as an empty table.

Another possible behaviour for rollback when the table has been modified is to allow all rows to remain in the table. This behaviour is not examined in this disclosure and is not supported in the current implementation.

Furthermore if a declared temporary table is not logged, the RDBMS needs to be able to handle a node failure in the context of declared temporary tables. If one node in the RDBMS fails and if a declared temporary table is partitioned on that node, then the table partition on that node will no longer exist, even if the node is restarted. In such a situation, the applications that have declared temporary tables on them need to become aware of this situation, otherwise they may assume they are still dealing with a complete partitioned table. The defined behaviour in this situation is the any attempt to access a declared temporary that had a partition on the node that failed will result in a specific error indicating that the table is not available for use.

BRIEF DESCRIPTION OF THE DRAWINGS

FIG. 3 illustrates a directory (list) of declared temporary tables maintained at the coordinator node for an application;

FIG. 4 illustrates some declared temporary directories (lists) at selected subordinate nodes; with FIG. 4(a) illustrating the directory of declared temporary tables at a selected subordinate node; and FIG. 4(b) illustrating a directory of declared temporary tables at another selected subordinate node;

FIG. 5 illustrates a flow chart for creating a declared temporary table in a multi-partitioned database environment in accordance with the invention herein, illustrating the sub processes carried on at each node in a nodegroup, including in the catalog node, coordinator node and at other nodes in a nodegroup;

FIG. 6 illustrates a flow chart for processing of SQL requests to run against one or more declared temporary table;

FIG. 7 illustrates a flow chart for dropping a declared temporary table in a multi-partitioned database environment in accordance with the invention herein, illustrating the sub processes carried on at each node in a nodegroup, including in the catalog node, coordinator node and at other nodes in a nodegroup;

FIG. 8 illustrates a flow chart for processing of declared temporary tables at transaction commit in a multi-partitioned database environment in accordance with the invention herein, illustrating the sub processes carried on at each node in a nodegroup, including in the catalog node, coordinator node and at other nodes in a nodegroup;

FIG. 9 illustrates a flow chart for the processing of the detection of a node failure;

FIG. 10 illustrates a flow chart for processing of declared temporary tables at transaction rollback in a multi-partitioned database environment in accordance with the invention herein, illustrating the sub processes carried on at each node in a nodegroup, including in the catalog node, coordinator node and at other nodes in a nodegroup;

FIG. 11 illustrates a flow chart for processing of declared temporary tables at application termination in a multi-partitioned database environment in accordance with the invention herein, illustrating the sub processes carried on at each node in a nodegroup, including in the catalog node, coordinator node and at other nodes in a nodegroup, where the coordinator node is not the catalog node; and, FIG. 12 illustrates a flow chart for processing of declared temporary tables at application termination in a multi-partitioned database environment in accordance with the invention herein, illustrating the sub processes carried on at each node in a nodegroup, including in the catalog node, coordinator node and at other nodes in a nodegroup, where the coordinator node is the catalog node;

DESCRIPTION OF PREFERRED EMBODIMENTS OF THE INVENTION

One of the major uses of computers has been the storage and accessing of data in databases. Relational database management systems (rdbms) may be used for this purpose. The operational software for the rdbms and data is typically stored in the computer storage, such as disk, while the management functions are performed in memory accessing the data and operational software on disk.

The following discusses the main aspects of the invention and how not-LOGGED application-temporary tables (declared temporary tables) are supported in a partitioned environment.

Figure 1:
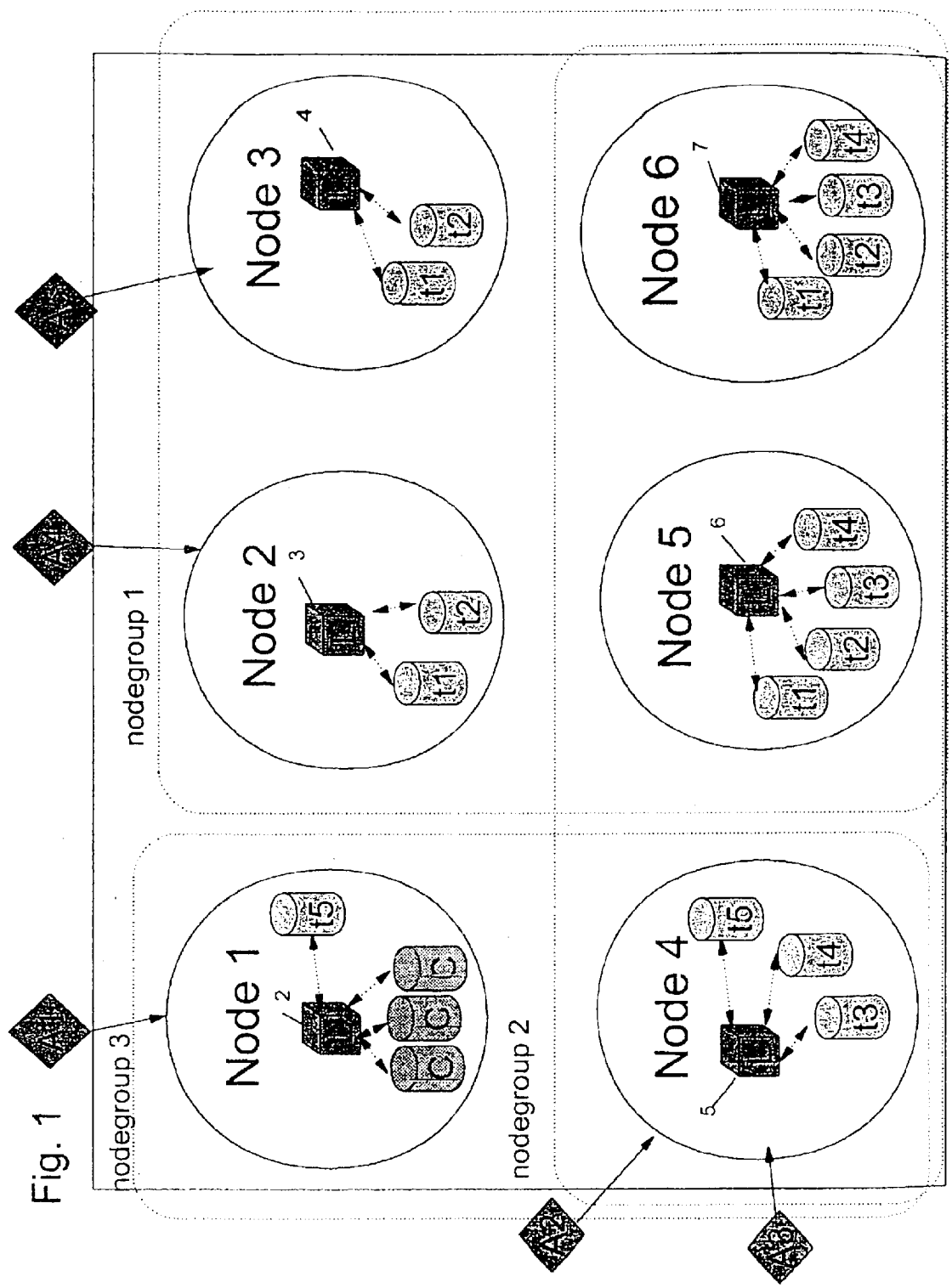
FIG. 1 illustrates a node layout of a database in a multi node environment, depicting nodes, 3 nodegroups, table partitions in nodes, including a catalog node with catalog tables, and applications connected to the database at nodes.

FIG. 1 illustrates a node layout of a multinode database 1 to which the invention herein can be used. It depicts nodes (Node1, Node2, Node3, Node4, Node5, and Node6), nodegroups (Nodegroup1, Nodegroup2, and Nodegroup3), logged tables (t1, t2, t3, t4, t5) partitioned across the nodes in the nodegroups in table partitions (t1, t2, t3, t4, t5 in the nodes), and also including a catalog node (depicted in Node 1) with catalog tables (C1, C2, and C3 shown as examples), and applications (A1, A2, A3, A4, and A5) connected to the database at the nodes shown.

In this example Node 1 is used as the catalog node and contains catalog tables C1, C2, C3 among others (not identified in the figure) which contain meta information, i.e. descriptions of logged data tables stored in the database. The meta information may include descriptions of columns of tables, indices, privileges on tables, relations between tables, functions, and other information relating to tables as would be well known to those skilled in the art. It may be seen that table t5 is partitioned across nodes 1 and 4, which are the nodes of Nodegroup 3. In this example Nodegroup 1 includes Nodes 2, 3, 5, and 6; Nodegroup 2 includes Nodes 4, 5, and 6; and Nodegroup 3 includes Node 1, and 4. It may be noticed that there is an overlapping of nodegroups. External applications (A1, A2, A3 . . . A5) which access the database are coordinated by the rdbms through nodes to which the applications are respectively connected; for instance application A1 is connected to Node 1 so that access to data on any of the nodes in the database is coordinated by the rdbms at Node 1. Similarly application A4 is connected to Node 2 and is therefor coordinated by the rdbms through Node 2.

Each node of the database which contains any table partitions includes a log L (The logs for Nodes 1, through 6 are indicated as 2, through 7 respectively) which is used by the rdbms to keep track of all changes to data in table partitions in that node. The changes are also logged with respect to transactions performed on behalf of specific applications. For instance, if one application rolls back a transaction then the rdbms will use the logs at each of the nodes, the partitions of which were changed by that application, to undo the changes made to all those partitions. The logs are also used for recovery purposes in event of node failures. The use of logs is well known and will not be detailed further.

The node to which an application is connected is referred to as its coordinator node, e.g. Node 1 is the coordinator node for application A1. Any other node in the database which the rdbms accesses on behalf of the application is referred to as a subordinate node. For example if application A1 accesses Node 4, then Node 4 would be referred to as a subordinate node of coordinator node, Node 1.

Figure 2:
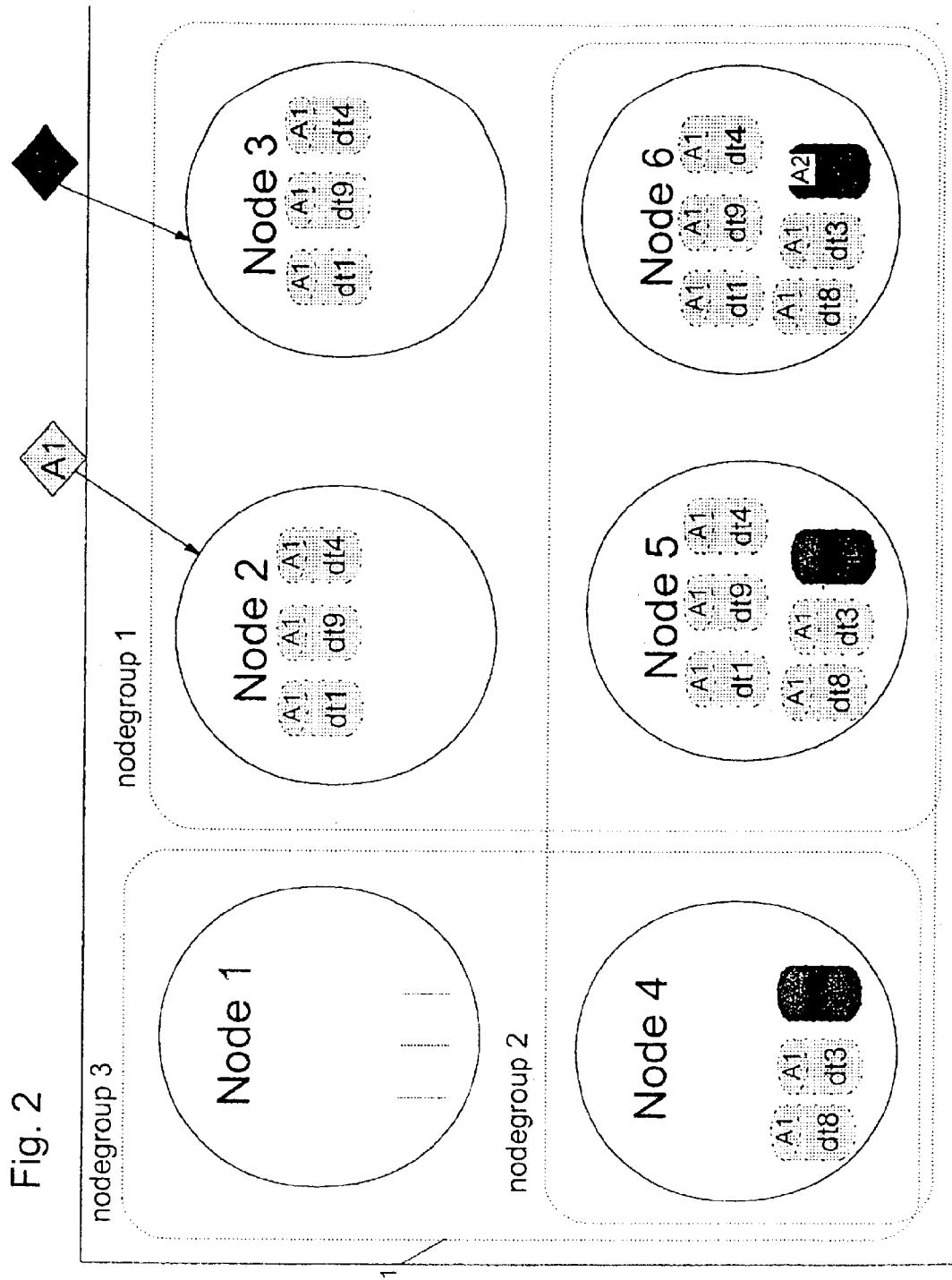
FIG. 2 illustrates a node layout of a database in a multi node environment, depicting nodes, 2 nodegroups, including a catalog node with catalog tables, applications connected to the database at nodes, and declared temporary tables, as declared at each node for the applications.

FIG. 2 illustrates the multinode database of FIG. 1 (suppressing illustration of the catalogues, logged tables, and logs and external applications accessing the logged tables for simplification) depicting declared temporary tables (dt1, dt3, dt4, dt8, dt9), as declared at the nodes for the illustrated external applications (A1, and A2). NB that in this application three not logged temporary tables (dt1, dt9, dt4) are declared in each of the nodes of nodegroup 1 for use by application A1, and 2 tables (dt3, and dt8) are declared in each of the nodes of nodegroup 2 for use by application A1, and as nodegroups 1 and 2 overlap, with nodes 5 and 6 being members of both nodegroups, there are 5 temporary tables partitions created in nodes 5 and 6 for application A1. Another declared temporary table dt4 is partitioned across nodes 4, 5, and 6 of nodegroup 2 for application A2. The partitions of dt4 associated with A1 are independent of the partitions of dt4 associated with application A2 and cannot be accessed by A2, and vice versa.

The 'current state' is a sum of relevant possible states. If none of the states apply to that declared temporary table partition, then the 'current state' will have a value of zero. If two (or more) states describe the state of this table (e.g. If the table was both 'created in the current transaction' and 'modified in the current transaction', then the 'current state' will be the sum of both those state values, i.e. 1+4=5).

FIG. 3 illustrates a directory (list) 30 of declared temporary tables maintained at the coordinator node (Node 2) for application A1. The rdbms maintains a list in computer memory of declared temporary tables for each application at the coordinator node for each application as well as on each subordinate node that contains a declared temporary table partition. On the coordinator node there is an entry (items 31, through 35) for all declared temporary tables created for the application even if the coordinator node is not part of the nodegroup of one or more of the tables. An entry consists of:

a) the table name, e.g. dt9;

b) an id e.g. 15 (note that each table is assigned a unique id by the rdbms upon creation to assist in rapid access by the rdbms). The application accesses the table by its name, e.g. dt9. All partitions of a table share the same id;

c) the 'at this node' flag, a flag which indicates the existence of a partition of that table at the coordinator node (e.g. T (true) means the partition of that table exists at the coordinator node; F false) the partition for that table does not exist at the coordinator node);

d) the 'current state' value reflects the state of the table e.g. created, dropped, modified in a current transaction or rendered inoperative, or none (using a value of 0) of the previous (created, dropped, modified or rendered inoperative) by the rdbms;

e) a nodelist listing nodes on which the table is partitioned; (the 'at this node' flag appears to be redundant as its information is included in the nodelist but offers speed advantages);

f) a table descriptor which describes the column properties of this table which can be used to compile a query against this table.

The tables for application A1 in FIG. 2 are illustrated in FIG. 3. The current states for the tables indicated in FIG. 3 may represent an example state for each at a point in time within the execution of an application.

FIG. 4 illustrates some declared temporary directories (lists) at selected subordinate nodes; with FIG. 4(a) illustrating the directory 40 of declared temporary tables (entries 41, through 43) at a selected subordinate node (node 3) in nodegroup 1; and FIG. 4(b) illustrating a directory 49 of declared temporary tables (entries 44 and 45) at another selected subordinate node (node 4) in nodegroup 2.

The entries of a list in a subordinate node include less items; namely, only the table name (e.g. dt9); the table id (e.g. 15); and the 'current state' (e.g. 1). Only the following states are represented: created in the current transaction, or dropped in the current transaction, and a table partition that is neither created nor dropped in the current transaction will have a 'current state' of 0

The subordinate node list only includes entries for tables that have partitions on those nodes.

In addition to the lists illustrated in FIGS. 3 and 4, there are other simple lists that are used in the management of declared temporary tables, namely:

a) the 'dropped entry' list. This is a list of ids of declared temporary tables that are currently in the process of being dropped. This list is created by the RDBMS at the coordinator node in the course of transaction-ending processing of the list of declared temporary tables of a specific application. At the end of the transaction-ending processing, this list is sent to the catalog node, processed at the catalog node, and then the list is freed at both the catalog and coordinator nodes.

b) the 'deferred drop' list. This is a list of ids of declared temporary tables maintained by the RDBMS at the catalog node. This list tracks the list of declared temporary table ids for which the RDBMS will release the id only when the application disconnects from the database.

c) the 'action entry' list. This is a list of ids of declared temporary tables and an associated 'action' that needs to be performed against that table. This list is created by the RDBMS at the coordinator node in the course of transaction-ending processing of the list of declared temporary tables of a specific application. This list is sent to subordinate nodes in the course of a transaction-ending 'rollback'; the subordinate nodes process the list (by acting on the table specified by the id in the manner specified in the 'action'; then the list is freed at the subordinate nodes and coordinator nodes.

FIGS. 5 through 12 illustrate the management of declared temporary tables in accordance with this invention.

More specifically FIG. 5 illustrates a flow chart for creating a declared temporary table in a multi-partitioned database environment in accordance with the invention herein, illustrating the sub processes carried on at each node in a nodegroup, including in the catalog node, coordinator node and at other nodes in a nodegroup.

When an application submits a request to create a declared temporary table (which includes column definitions for the table, the table name and optionally the nodegroup in which to create the table) to the rdbms at the coordinator node then the rdbms assigns a coordinator agent at the coordinator node to handle 51 the request. A nodegroup is chosen 52 by the agent either in accordance with the request or if not specified in the request based on the best suited nodegroup depending on column definitions in accordance with normal table handling practices of the rdbms as will be understood by those skilled in the art. The agent searches 53 for an entry for table1 in a list of declared temporary tables (such as illustrated in FIG. 3) for that application. If it is found 54 an error is returned 55 to the application and the processing of that request completes. If the table is not found then the agent sends a request 56 to the catalog node (Node 1 in this example) to reserve an ID for the table. An agent on the catalog node reserves the ID 57 and sends the ID back to the agent at the coordinator node that requested it. Then the agent at the coordinator node sends 59 a request to each node in the chosen nodegroup to declare 60 a temporary table partition at the node and if 61 it is a subordinate node to create 62 an entry in the list of declared temporary tables of that subordinate node for that application and mark 63 the entry as "created in this transaction". An agent at each of the nodes in the node group carries out that request. When all nodes in the nodegroup have acted on this request the coordinator agent then inserts 66 an entry in its node list of declared temporary tables for that application with elements as indicated in FIG. 3. If 67 the coordinator node is part of the chosen nodegroup then 68 the "at this node" flag in the entry is set to "True", and the "current state" is set 69 to "created in this transaction".

Referring to FIG. 6 which illustrates a flow chart for dropping a declared temporary table in a multi-partitioned database environment in accordance with the invention herein, illustrating the sub processes carried on at each node in a nodegroup, including in the catalog node, coordinator node and at other nodes in a nodegroup. When an application submits a request to drop a declared temporary table to the rdbms at the coordinator node 81 then the rdbms assigns a coordinator agent at the coordinator node to handle the request. The agent searches 82 for an entry for table 1 in a list of declared temporary tables (such as illustrated in FIG. 3) for that application. If 83 not found an error is returned to the application and the processing of that request completes 84. If the table is found then the agent sends 85 a request to all nodes in the nodegroup of that table to process the node specific drop of that declared temporary table based on the id of the table.

At each node in the nodegroup the list of temporary tables is searched 86 for an entry with a matching id. If not found processing at this node ends 92. If 87 found then the 'current state' is evaluated 89. If the 'current state' indicates that this partition was created in the current transaction then the table partition is dropped 93 and if 94 this node is not the coordinator node then the entry in the list of declared temporary tables is removed 95. If it is not created in the current transaction then all rows in that partition are deleted 90, but the table partition is not dropped. The 'current state' is set 91 to be "dropped in the current transaction". This is the end 92 of the processing of this type of request that occurs at each node in the nodegroup.

At the coordinator node the success or failure of the operation of dropping a temporary table at the other nodes is evaluated 97. If one or more of the nodes did not complete the drop request successfully then the 'current state' in the entry of declared temporary tables at the coordinator node for the application is set 98 to INOPERATIVE. Then a request is sent 99 to the catalog node to add 100 the id of the table to the 'deferred drop' list for that application; an agent at the catalog node receives the request and adds the id accordingly. An error indicating the failure of the drop is returned 101 to the application. Any subsequent request from the application to drop this table will be blocked by the RDBMS and an error will be returned. The only request to act on this table that will be processed is another DROP TABLE request.

If however, all nodes have completed the drop request successfully, and the 'current state' of the table indicates 102 that it was 'created in the current transaction', then the RDBMS is guaranteed that this table no longer exists on any node; the entry in the list of declared temporary tables at the coordinator node for the application is removed 103 and a request is sent 104 to the catalog node to release the id used by the table. At the catalog node, an agent releases 105 the id.

FIG. 7 illustrates a flow chart for processing of relational database queries that the application submits against a declared temporary table. When an application submits such a request, the RDBMS assigns a coordinator agent at the coordinator node to handle 201 this request. If a table name is referenced in the query, then the list of declared temporary tables for that application at that node is searched 202 for a matching table name. If no match is found, then the RDBMS assumes that the application was attempting to access an ordinary table and continues processing 208 as it does for normal tables. If a matching table name is located in the list of declared temporary table, then the table descriptor that is included in the declared temporary table entry is used, 203, to compile the query. If, 204, during compilation of the query, it is determined that the query may modify the contents of one or more declared temporary tables, then before executing the query, the 'current state' of the declared temporary table being modified is set, 205, to 'modified in current transaction'. The query is then executed, 206, as normally executed in the RDBMS.

FIG. 8 illustrates a flow chart for processing of declared temporary tables at transaction commit in a multi-partitioned database environment in accordance with the invention herein, illustrating the sub processes carried on at each node in a nodegroup, including in the catalog node, coordinator node and at other nodes in a nodegroup for a transaction to be committed i.e. made permanent.

An application issues a commit request to make a current transaction permanent.

When the application submits a commit request to the rdbms at the coordinator node then the rdbms assigns a coordinator agent at the coordinator node to handle the request. The coordinator agent progresses, 210, through the full list of temporary tables at the coordinator node for that application. For each entry in the list the 'current state' is checked, 211. If it indicates that the table partition was 'dropped in the current transaction' then the following actions are taken:

a) if the "at this node" flag is set to "True" then the local partition is dropped, 212;

b) the entry in the list of temporary tables is removed, 213;

c) an entry in the 'dropped entry' list is added indicating the id of the table, 214.

If the 'current state' does not indicate that it was dropped in the current transaction then the 'current state' is set, 217, to 0.

As required by the multi-node nature of the RDBMS, a commit request is sent to all subordinate nodes that (the RDBMS has kept track as having been involved in the transaction) were involved in the current transaction (i.e. This occurs independently of the handling of declared temporary tables), 219, telling those nodes to process a transaction commit for that application. At each subordinate node involved in the current transaction an agent progresses through the full list of temporary tables at that node for that application. For each entry in the list the 'current state' is checked. If it indicates that the table partition was dropped in the current transaction then the following actions are taken:

a) the local partition is dropped, 222;

b) the entry in the list of temporary tables is removed, 223.

If the 'current state' does not indicate that it was dropped in the current transaction then the 'current state' is set, 226, to 0.

When all other nodes in the transaction have completed processing the commit request the success of the operation on the other nodes is evaluated 228 at the coordinator node. If one or more of the nodes failed to commit, a rollback is initiated, 229, by the agent and an error is returned to the application. If all nodes complete the request successfully then a request is sent, 231, to the catalog node to release all of ids in the dropped entries list. An agent on the catalog node releases, 232, all the ids sent to it and the dropped entries list is freed, 233, at the coordinator node.

FIG. 9 illustrates a flow chart for the RDBMS's processing of a 'node failure' at a given node. The RDBMS running at a given node keeps track of all applications that are connected to the database at that node, i.e. those applications that are 'coordinated' at that node. When one (or more) of the nodes of an RDBMS multi-node system fails in one way or another, the RDBMS running at each of the nodes is notified, 301, of the failure of this node(s). When this happens, and the RDBMS running at one of the nodes that did not fail receives this notification, then it progresses through the list of applications that are coordinated at that (non-failed) node. For each of these applications (see steps 302 to 307), the list of nodes involved in the current transaction for that application is checked, 302, to determine if (any of) the failed node(s) are in the current transaction node list, 303. If (any of) the failed node(s) is in the current transaction list, the application is interrupted, 306, and a rollback is initiated for that application. The processing of the node failure is done regardless of whether declared temporary tables are involved. In accordance with the invention, further processing is performed in order to accommodate declared temporary tables. For applications not interrupted in the prior step, then the application's node is examined, 304, to see if its 'application node list' includes (any of) the failed node(s). The 'application node list' defines all the nodes that were at any point involved in the execution of the application (i.e. Even before the current transaction). If (any of) the failed node(s) are included in the application node list, then the RDBMS examines, 305, if that application has any declared temporary tables. If it does have any declared temporary tables then that application is interrupted, 306, and a rollback is initiated for that application.

FIG. 10 illustrates a flow chart for processing of declared temporary tables at transaction rollback in a multi-partitioned database environment in accordance with the invention herein, illustrating the sub processes carried on at each node in a nodegroup, including in the catalog node, coordinator node and at other nodes in a nodegroup;

A rollback can occur from an application request or can be issued by the rdbms, in particular the rdbms may issue a rollback when a commit request fails, or if the rdbms detects that a node failure has occurred on one of the nodes in the database system then it will initiate a rollback request for all applications that have declared temporary tables defined.

The rdbms assigns a coordinator agent at the coordinator node to handle the request. The coordinator agent progresses (from step 401) through the full list of temporary tables at the coordinator node for that application. For each entry in the list the 'current state' is checked, 402. If it indicates that the table partition was created in the current transaction then the following actions are taken:

a) if the "at this node" flag is set to "True" then the local partition is dropped, 403;

b) the entry in the list of temporary tables is removed, 404;

c) an entry in the dropped entries list is added indicating the id of the table, 405.

If the 'current state' does not indicate that it was created in the current transaction then the rdbms is queried as to whether or not the node failure has been identified. If there has been a node failure, 408, then the current entries node list is checked to see whether it includes any of the failed nodes, 409. If it does then the following actions are taken:

a) if the "at this node" flag is set to "True" then the local partition is dropped, 410;

b) the 'current state' of the entry is set to Inoperative, 411;

c) an entry to the 'action entry' list is added indicating this table's id and an action of "drop table", 412;

d) an entry in the dropped entries list is added indicating the id of the table, 413.

e) the list of nodes involved in the current transaction is expanded to include all of the nodes in the table's node list, 414.

If the table has not been dropped then the agent checks if the 'current state' of the table is 'modified in the current transaction', 416. If it is then the following actions are taken:

a) if the 'at this node' flag is set to "True" then all rows of the local partition are deleted, 417;

b) an entry to the 'action entry' list is added indicating this table's id and an action of "delete rows", 418;

c) an entry in the dropped entries list is added indicating the id of the table,.

d) the list of nodes involved in the current transaction is expanded to include all of the nodes in the table's node list, 419;

e) the 'current state' is set to 0, 420.

If the 'current state' does not indicate that the table was 'modified in the current transaction' then the 'current state' is set to 0, 420.

Once all of the entries in the list of declared temporary tables for that application have been processed (see steps 421, 422, 400), then as required by the multi-node nature of the RDBMS, a rollback request is sent to all nodes that were involved in the current transaction, 424, (i.e. this is done by the rdbms regardless of whether an application has any declared temporary tables). In accordance with the invention, this list of nodes involved in the current transaction has already been expanded in the rollback processing at the coordinator node to include all the nodes of any table against which an 'action' is pending, i.e. for all tables for which an entry in the 'action entry' list has been created. Together with the rollback request, the list of 'action entries' is sent to all those nodes.

At each subordinate node involved in the current transaction an agent assigned by the RDBMS first progresses through (see step 425 et seq.) the 'action entry' list that was sent to it from the coordinator node. For each entry in the 'action entry' list, the id of the entry is searched, 426, in the list of temporary tables at that node for that application. If an entry is found, 427, the action indicated in the action entry is taken, 428, against that table; i.e. if the action entry indicated to 'drop table', then the partition for that declared temporary table is dropped and its entry from the list of declared temporary tables is removed; if the action entry indicated to 'delete all rows', then all rows for that table partition are deleted.

Once the 'action entries' list has been completed (see steps 429, 430), the subordinate node agent then proceeds to process the list of temporary tables (see steps 432 et seq.) at that node for that application. For each entry in the list the 'current state' is checked, 433. If it indicates that the table partition was created in the current transaction then the following actions are taken:

a) the local partition is dropped, 435;

b) the entry in the list of temporary tables is removed, 436.

If the 'current state' does not indicate that it was dropped in the current transaction then the 'current state' is set to 0, (step 434).

When all other nodes in the transaction have completed (step 439) processing the rollback request the success of the operation on the other nodes is evaluated, 441, at the coordinator node. If all of the nodes completed the rollback successfully, then a request is sent to the catalog node to release all of ids in the dropped entries list, 442. An agent on the catalog node releases all the ids sent to it, 445, and the dropped entries list is freed, 446, at the coordinator node.

If, however, one the nodes did not complete their rollback processing successfully then a request is sent, 443, to the catalog node to add all of ids in the dropped entries list to the 'deferred drop' list on the catalog node. An agent on the catalog node creates an entry in the 'deferred drop' list for that application for each of the 'dropped entries' sent to it, 444. The dropped entries list is freed at the coordinator node, 446.

FIGS. 11 and 12 illustrates a flow chart for processing of declared temporary tables when an application with declared temporary tables disconnects from the database in a multi-partitioned database environment in accordance with the invention herein, illustrating the sub processes carried on at all of the nodes involved in executing on behalf of the application, including in the catalog node, coordinator node and at all other nodes communicated with by the RDBMS in the course of the execution of the application. Since the logic differs when the coordinator node is also the catalog node and when it is not, two flow charts are shown. In either case, the catalog node is the last node to complete application ending processing.

FIG. 11 illustrates a flow chart for processing of declared temporary tables when an application with declared temporary tables disconnects from the database, when the coordinator node is not the catalog node.

When an application issues a request to 'disconnect from the database', The RDBMS at the coordinator node assigns a coordinator agent to handle the request. The coordinator agent progresses through the full list of temporary tables at the coordinator node (see steps 501 to 506) for that application. For each entry in the list the following actions are taken:

a) if the "at this node" flag is set to "True" then the local partition is dropped, 502;

b) the entry in the list of temporary tables is removed, 503;

c) an entry in the 'dropped entry' list is added indicating the id of the table, 504.

After removing all entries in the list of declared temporary table list, the coordinator agent sends a request to the catalog node to add all of the entries in the 'dropped entry' list to the 'deferred drop' list maintained at the catalog node for this application, 507. An agent at the catalog node carries out this request, 509.

The coordinator agent then sends a request, 510, to all subordinate nodes, except the catalog node involved in executing on behalf of the application instructing all nodes to end processing on behalf of the application.

An agent at each of these subordinate nodes, acting on this request, progresses through the list of temporary tables (steps 511 to 515) at that node for that application. For each entry in the list the following actions are taken:

a) the entry in the list of temporary tables is removed, 512;

b) an entry in the 'dropped entry' list is added indicating the id of the table, 513.

Once all the subordinate nodes complete their processing, the coordinator agent then sends a request, 517, to the catalog node requesting to end processing on behalf of the application at the catalog node.

An agent at the catalog node, acting on this request, progresses through the list of temporary tables at that node for that application (see steps 518 to 523). For each entry in the list the following actions are taken:

a) the local partition for the table is dropped, 519.

b) the entry in the list of temporary tables is removed, 520;

b) an entry in the 'dropped entry' list is added indicating the id of the table.

Then the agent at the catalog node releases the ID of all of the entries in the 'deferred drop' list, 523. This list will include table Ids both from tables dropped during application termination, as well as those that may have been 'partially dropped' when dropping tables earlier in the application execution.

FIG. 12 illustrates a flow chart for processing of declared temporary tables when an application with declared temporary tables disconnects from the database, when the coordinator node is the catalog node.

When an application issues a request to 'disconnect from the database', The RDBMS at the coordinator node assigns a coordinator agent to handle the request. The coordinator agent first sends a request to all subordinate nodes involved in executing on behalf of the application instructing all nodes to end processing on behalf of the application, 601.

An agent at each of these subordinate nodes, acting on this request, progresses through the list of temporary tables at that node for that application (see steps 602 to 606). For each entry in the list the following actions are taken:

a) the local partition for the table is dropped, 603;

b) the entry in the list of temporary tables is removed, 604.

Once all the subordinate nodes complete their processing, the coordinator agent then progresses through the full list of temporary tables at the coordinator node for that application. For each entry in the list the following actions are taken:

a) if the "at this node" flag is set to "True" then the local partition is dropped, 609;

b) the entry in the list of temporary tables is removed, 610;

c) an entry in the 'dropped entry' list is added indicating the id of the table, 611.

After removing all entries in the list of declared temporary table list, the coordinator agent (which is on the coordinator node) then releases all of the Ids in the 'dropped entry' list, 614. As well if there are any entries from earlier in the 'deferred drop' list, all those Ids are released as well.

Discussion of the Invention

The description that follows is a somewhat more general description of the invention, with references to the drawings for the purpose of general guidance. Numeric reference to the items in the drawings will not be made to preserve the generality of the discussion.

1. Creating a Declared Temporary Table in a Multi-Partitioned Environment (see FIG. 5, as well as 3 and 4)

In order to create a declared temporary table in a particular partition setup (nodegroup), a unique table identifier must first be reserved, since many of the components of an RDBMS access the table based on this identifier only. The maintenance (reserving/unreserving) of the unique identifiers is restricted to one node.

For declared temporary tablespace, the one node that is used to maintain the list of unique identifiers is the catalog node, and the management of this list is done via an in-memory structure for fastest access. If any other node were used to maintain this list then if that node failed, all reserved identifier information would be lost even though partitions of declared temporary tables may exist at other nodes, and may still be in use. By using the catalog node as the identifier-maintaining node, we know that if the catalog node fails the entire database operation will be stopped, and thus all partitions at all other nodes will be dropped regardless.

After reserving the identifier, the coordinator agent will then dispatch a request to all nodes in the nodegroup to create a partition there. In addition to creating the data partition, each subordinate node in the nodegroup of the table also creates an (in-memory) entry in the directory of declared temp tables for that application. The entry at each of these subordinate nodes will identify (see FIGS. 4(*a*), (*b*)) the table partition by unique identifier and will indicate the current state of the table at that node; during creation time the current state is marked as 'created in the current transaction'. This entry in the directory of declared temporary tables will be used for transaction cleanup as well as application termination.

At the coordinator node an entry is also created in the directory of declared temp tables for that application—even if the coordinator node is not one of the nodes in the nodegroup of the table (see FIG. 3). This entry includes more detailed information of the state of the table as well as a descriptor of the table kept for the SQL compiler. The entry at the coordinator node also includes the node list for this table, i.e. a list of all the nodes on which this table has a partition. This is used in a 'node failure' situation (see below).

Note that for logged tables, the creation of the table at each node is logged; the table definition is maintained in the catalogs for further reference.

2. Dropping a Declared Temporary Table in a Multi-Partitioned Environment (see FIG. 6, as well as FIGS. 3, and 4)

If an explicit request is made to drop a declared temporary table, then the coordinator agent dispatches in parallel a request to all subordinate nodes in the nodegroup of the table to drop the table's partitions. At each of the subordinate nodes, the entry for the table is found in the declared temporary table directory. If the current state indicates that the table was created in the current transaction, then the table partition and the associated entry is dropped. Once the coordinator node is ensured that all the other nodes have successfully dropped successfully, a request is sent to the catalog node to 'unreserve' the table identifier associated with the table. If however, there is a failure at one or more of the nodes to drop the table, then a request is sent to the catalog node to maintain that table's identifier in a (in-memory) list of that applications 'failed drops'. Since there is one or more nodes that have not yet dropped the table partition, the identifier is still in use and we cannot release the identifier to be used by the system. The releasing of the 'failed drops' identifiers is deferred until application termination. See below.

If the current state does not indicate that the table was created in the current transaction, then all rows of the table are deleted, and the entry is marked as 'dropped in the current transaction'. Subsequently the attempts to access this table by application will result in a 'table not found' error. However, by not actually dropping the table at this point, the table can be restored (with no rows) if the transaction is rolled back, by simply removing the 'dropped in the current transaction' designation.

3. Running a Query against a Declared Temporary Table in a Multi-Partitioned Environment (see FIG. 7, and FIG. 3)

When the application that created the declared temporary table issues SQL against that table (a single query can be issued against zero or more declared temporary tables and zero or more regular tables), the descriptor of the declared temporary table is found in the application's directory of declared temporary tables. This descriptor is used by the SQL compiler to translate the SQL into runable form (a section) and placed in the SQL cache. The SQL compiler also compiles a list of all the declared temporary tables that the query potentially performs a modification (insert, update or delete); this list is maintained together with the section in the SQL cache.

When running the compiled section, all the declared temporary tables that are in this list of 'potentially modified', are marked as having a current state of 'modified in current transaction'. Since the section is not necessarily run at all nodes that the table is partitioned on, this state is only maintained at the coordinator node. By maintaining this information at the coordinator node only, we do not have to take an extra step to send out a notification to other nodes to ensure that the table is similarly marked at the subordinate nodes 4. End of Transaction Processing (see FIGS. 8 and 10)

In the DB2 product, when the transaction ends, then the coordinator node first performs its unit of work ending cleanup, and then a request is sent in parallel to all subordinate nodes involved in the transaction (the list of this node is maintained by DB2).

Relying on this order of processing, the handling of declared temporary tables within transaction (transaction)-ending processing proceeds along the following logic:

At the coordinator node the state of each of the declared temporary tables is examined. Based on the states, the following actions are performed for each table:

1) For commit of the transaction:
   a) if the table is marked as having the state of 'dropped in this UOW', then the table partition at the coordinator node is dropped, as is the entry in the declared temporary table directory. An entry is added to an in-memory maintained list of 'dropped entries'. No attempt is made at this point to access other nodes to drop the entries at other partitions or to the catalog node to unreserve the identifier used by the table.
   b) any other state of the table is cleared.
2) For rollback of the transaction:
   a) if the table is marked as having the state of 'created in this UOW', then the table partition at the coordinator node is dropped, as is the entry in the declared temporary table directory. An entry is added to an in-memory maintained list of 'dropped entries'. No attempt is made at this point to access other nodes to drop the entries at other partitions or to the catalog node to unreserve the identifier used by the table.
   b) Otherwise, if the table is marked as having the state of 'dropped in this UOW', then that designation is cleared. This allows that table that was dropped in the transaction to be restored (but with no rows)
   c) Otherwise, if the table is marked as having the state of 'modified in the current transaction', then the all rows in the local partition of this table are deleted, and an entry is added to an in-memory maintained list of 'action entries' with the designation of 'delete all rows'. The 'modified in the current transaction' designation is cleared.

Since the 'modified in this transaction' state is only maintained at the coordinator node, this action will be subsequently propagated to all nodes on which that declared temporary table is partitioned, and it will be propagated using together with the rollback request itself (see below). Thus, in order to ensure that all nodes that have partitions process the 'delete all rows' action, the list of nodes involved in the current transaction that DB2 maintains is expanded to include all the nodes on which the table is partitioned as well.

After processing all the declared temporary tables for either rollback or commit, the coordinator node has compiled two lists, the first, zero or more 'dropped entries' entries, and the second, zero or more 'action entries'.

When DB2 sends from the coordinator node a request in parallel to all the subordinate nodes to carry out subordinate node transaction-ending processing, it checks the list of 'action entries'. If the action entries list has more than zero members, then this list is added to the request information that is sent across the wire (this is known as 'piggybacking' the transaction request).

At the subordinate nodes the following steps are followed when it receives the transaction-ending request:

3) If there are entries in the 'action entries' list that came with the transaction-ending request, then for each of these entries, the directory of declared temporary tables is checked for the table identified in the 'action entry'. If an entry in the directory does not match, then it is assumed that the table identified in the 'action entry' does not have a partition at that node. If an entry is found in the directory, then the action identified in the 'action entry', (i.e. delete all rows) is carried out.

After processing the action entries, the subordinate nodes each process their own declared temporary table list in a manner similar to what is done on the coordinator node as follows:

4) For commit of the transaction:
   a) if the table is marked as having the state of 'dropped in this transaction', then the table partition at the coordinator node is dropped, as is the entry in the declared temporary table directory.
   b) any other state is cleared.
5) For rollback of the transaction:
   a) if the table is marked as having the state of 'created in this transaction', then the table partition at the coordinator node is dropped, as is the entry in the declared temporary table directory.
   b) Otherwise, if the table is marked as having the state of 'dropped in this transaction', then that designation is cleared. This allows that table that was dropped in the transaction to be restored (but with no rows).

When all subordinate nodes have completed the processing of their local transaction-ending processing, control is returned to the coordinator node. At the coordinator node, since the 'actions entry' list has already been distributed it is now freed.

If there are more than zero entries in the list of 'dropped entries', then the processing evaluates the overall success of the commit or the rollback at the subordinate nodes:

6) If all the nodes completed the operation successfully, then a request is sent to the catalog node to release (unreserve) all of the identifiers listed in the 'dropped entries' list. It is guaranteed that all partitions of those tables have been dropped, so it is now safe to release the identifiers for general use.

The 'dropped entries' list at the coordinator node is freed.

7) If there is a failure at one of the subordinate nodes, there is insufficient knowledge as to whether or not all or any of the tables 'dropped entries' failed to be dropped at any or all of the subordinator nodes. A request is sent to the catalog to add all of the entries in the 'dropped entries' list from the coordinator to the 'deferred dropped' list kept at the catalog node. This ensures that the identifiers for these tables are not released to be used (until application termination). The 'dropped entries' list at the coordinator node is freed.

To summarize, this mechanism allows each subordinate node to process its own declared temporary table directory for the rollback or the commit of 'creates' and 'drops' of tables, since all subordinate nodes already maintain that knowledge from the time the 'create' or 'drop' request was distributed. However for information that the subordinate nodes are unable to keep track of (i.e. whether or not the table was modified in this transaction), the coordinator node uses the 'piggyback' mechanism to transmit this information to the other nodes along with the transaction request. This allows for the synchronization and maintenance of these tables that, for regular tables, would inherently be processed in the management of the DB2 log files. At the same time, minimal additional requests over the network is necessary to ensure that the proper action occurs at all nodes.

5. Node failure

Since declared temporary tables are not logged, if a node on which a temporary table partition resides fails, then the declared temporary table partition on that node ceases to exist. It is necessary to ensure that no requests reach that failed node to access a table that doesn't exist. As well it is necessary that any attempt to access the table is met with some error, so that the application is aware that the table has lost one of its partitions and is permanently damaged.

If one of the nodes in a multi-node system fails, the DB2 product ensures that all the other nodes are aware of the node failures before it can communicate with this node; at each of those nodes, DB2 progresses through all of the applications (i.e. at their coordinator nodes only) that are currently in a unit of work that involves that nodes and initiates a rollback (via DB2's interrupt processing).

For this invention, when progressing through the list of all applications, DB2 will also initiate a rollback for all applications (at the coordinator node only) that have declared temporary tables currently created (which includes tables that have been dropped, but the drop is not yet committed and potentially can be rolled back) and will also maintain a list of all the 'failed nodes' that is guaranteed to be available until all applications have had a chance to process this list (see FIG. 9).

This will ensure that all applications that have declared temporary tables at that node (and even not at that node) are sent a rollback before any further communication can take place with the failed node. The recovery from a rollback initiated by node failure is somewhat different than a normal application-driven rollback described above in part 4. When a rollback is processed and the declared temporary tables are being processed, the list is checked to see if it has any entries. If it doesn't have any entries, then the rollback is treated as a 'normal rollback'. If there are entries, then rollback logic described above for regular rollback of a transaction has the following addition (see FIG. 10):

When progressing through all of the entries in the declared temporary table directory at the coordinator node, the node list of the table is checked; if the node list includes any of the nodes in the 'failed nodes' list, then that entry is marked at the coordinator node as 'inoperative'. This way only those tables with partitions on failed nodes are deemed inoperative, and the other tables can continue to be used. The table partition at the coordinator node is dropped, and an entry is added to the 'action entries' list for this table with an action of 'drop table'. The list of subordinate nodes that will be receiving the rollback request is expanded to include all nodes of the table.

Once all the entries are processed, this 'action entries' list entry is propagated to all other nodes together with the other 'action entries' in the list that is 'piggybacked' on the transaction request as described before. When the subordinate nodes receive the rollback request and progress through the action entries that were piggybacked, then an entry is searched in the subordinate node's directory of declared temporary tables as before. If found and if the action associated with the entry is 'drop table', then the table partition is dropped as well as the entry itself.

Thus we end up with the table fully dropped at all subordinate nodes, and at the coordinator node the table partition is dropped, but the entry remains in the declared temporary table directory, marked as inoperative. This entry is needed so that subsequent requests by that application to access that table can be identified as being in-error since the table is inoperative. The only request that will complete successfully for this entry is a request to 'DROP TABLE', which will just remove the entry at the coordinator node as well.

6. Application termination

In the DB2 product, when the application ends, then the catalog node is guaranteed to be processed as the last node to perform its cleanup on behalf of the application (the catalog node is also guaranteed to be either one of the subordinate nodes or the coordinator node of all applications). Relying on this order of processing, the handling of declared temporary tables at application termination proceeds along the following logic (see FIGS. 11 and 12):

1) At the coordinator node (if it is not the catalog node):
  all table partitions in the declared temporary table directory are dropped as well as their entries in the directory (at the coordinator node only). For each table that is dropped, an entry is added to an in-memory maintained list of 'dropped entries'. Once all table partitions are dropped locally, a request is sent to the catalog node to add all the 'dropped entries' to its list of 'deferred drops' for that application. Although the drop has not, in fact, failed, the table partitions are not yet dropped yet on subordinate nodes, so the coordinator node cannot yet inform the catalog node to unreserve the identifiers associated with the tables. However, DB2 guarantees that all the subordinate nodes will process application termination logic, so it is guaranteed that by the time the catalog node finishes its processing all entries in the 'failed drops' will in fact be dropped at all nodes. The 'dropped entries' list at the coordinator node is freed.

2) At all subordinate nodes (not including the catalog node):
  all table partitions in the declared temporary table directory are dropped as well as their entries in the directory at that node.

3) At the catalog node (if it is either the coordinator node or a subordinate node):
  all table partitions in the declared temporary table directory are dropped as well as their entries in the directory at the catalog node.
  If the catalog node is also the coordinator node, then for each table that is dropped, an entry is added to an in-memory maintained list of 'dropped entries'. Once all partitions are dropped locally, then all of identifiers in the tables in the 'dropped entries' list is unreserved, since we know that this node is the last node to drop its declared temporary table partitions, and thus the identifier is no longer in use at any node. The dropped entries is freed.
  All of the identifiers of the tables listed in the 'deferred drop' list (both from earlier failed drops and from the application termination if the coordinator node is not the catalog node) are now unreserved. We are now guaranteed that all nodes have dropped all partitions ever associated with this application.

To summarize, local node management of the directory of temporary tables ensures that all tables are dropped at all nodes without having to send explicit requests to subordinate nodes to accomplish this. By ensuring that the catalog node drops its entries last, we are able to free all identifiers used by this application, so that they are free to be used by other tables in the system. In this way we ensure that all potential identifiers are not used up by applications that were unable to drop their declred temporary tables at some point or another.

The following pseudo code may be used by those skilled in the art to create embodiments of the invention herein:

```
Pseudo code
/*
Description:
```

1) When a create table is specified by the application and the RDBMS chooses an appropriate target nodegroup, the create_declared_temp( ) function is called by the RDBMS-assigned coordinator agent.
2) When a drop table is specified by the application for a declared temporary table, drop_declared_temp( ) is called by the RDBMS-assigned coordinator agent.
3) When a query is issued by the application against a table, query_declared_temp_table( ) is called by the RDBMS-assigned coordinator agent.
4) When a commit is specified by the application, the coord_commit( ) function is called by the RDBMS-assigned coordinator agent.
5) When a rollback is specified by the application, the coord_rollback( ) function is called by the RDBMS-assigned coordinator agent.
6) When an application disconnects from a database, the appterm( ) function is called by the RDBMS-assigned coordinator agent.
7) When the RDBMS running at a given node detects that a node has failed, then the failed_node_recovery( ) function is called The following pseudo-code uses C++ comment notation (i.e. "//"), and general C coding style.

```
*/
/******************/
// Basic Data types:
/******************/
typedef declared_table_entry
{
  char                  name[];
  int                   ID;
  Bool                  at_this_node;
  int                   current_state;
  struct table_descriptor *table_descriptor;
  struct nodelist       *nodelist;
};
typedef action_entry
{
  int ID;
  int action;
};
typedef dropped_ID
{
  int ID;
};
/***********/
// Lists:
/***********/
// Note that all these lists are maintained by the RDBMS for each
   application.
```

```
-continued

// At any node:
declared_table_list; // (List of declared_table_entry entries)
// At catalog node:
deferred_drop_list; // (List of dropped_ID entries)
// Constructed on coordinator node during commit and rollback:
action_list; // (List of action_entry entries - sent to subordinate nodes in
transaction)
dropped_list; // (List of dropped_ID entries - sent to catalog node)
// List of nodes that fail
failed_node_list;
// List of nodes involved in the current transaction
transaction_node_list;
// List of nodes involved in the current application
application_node_list;
/********************************/
// Basic building block functions:
/********************************/
// Basic list functionality:
insert_into_list(list_name_entry);
multiple_insert_into_list(list_name, list);
remove_from_list(list_name, entry);
(struct *) lookup_in_list (list_name, lookup_key);
// Basic inter-node functionality:
send_request(node_list, function_to_execute);
// Basic id reservation functionality:
reserve_id(*id); // returns the id that is reserved
release_id(); // releases the id that is specified
// basic partition functionality
create_table_partition(id, table_descriptor, LOGGED or
NOT_LOGGED);
drop_table_partition(id);
delete_rows_in_partition(id);
/****************************************/
// Declared temporary table functions:
/****************************************/
//
// Part A. Functions specific to Creating a declared temporary table
//
// function entered from coordinator node that accepts the request to
// create a table of a given description into a specified nodelist
create_declared_temp(table_name, table_descriptor, target_nodelist)
{
  // lookup in the declared temporary table list for a matching name
  // if table already exists, return with an error
  if (lookup_in_list(declared_temporary_table_list,
    table_name) != NULL)
      return(table_exists_error);
  // send request to the catalog node to reserve an ID
  send_request(catalog_node,       // send request to catalog node
        reserve_token(&id));
  // send request to all nodes in the nodegroup to create a declared table
  partition
  send_request(target_nodelist,
        create_declared_temp_atanode(table_name, table_descriptor, id));
  // the coordinator node always has a declared temp entry - even if the
  // nodegroup does not include the catalog node.
  insert_declared_temp_entry(table_name, id, table_descriptor,
  target_nodelist);
}
// function to create a declared temporary table (the partition as
// well as the entry in the declared temp table list entry
// is created herein).
create_declared_temp_atanode(table_name, id, table_descriptor)
{
  // call RDBMS's lower level functions to create a not logged table
  // partition with the id and table_descriptor provided
  create_table_partition(id, table_descriptor, NOT_LOGGED);
  // also create a declared temp entry in the declared temp table list; if
  // this is not the coordinator node. If this is the coordinator node,
  // the entry will be created in create_declared_temp() processing
  if (current_node != coordinator node)
  {
    // on subordinate node, do not include the table_descriptor and
    // the nodelist in the entry. That information is not needed,
    // and excluding it saves space.
    insert_declared_temp_entry(table_name, id, NULL, NULL)
  }
}
```

-continued

```
// allocate and insert a new entry into the declared temporary table
// list. This is used at both the coordinator node and subordinate
// nodes; the coordinator node entries will include more information and
// take up more memory
insert_declared_temp_entry(table_name, id, table_descriptor, nodelist)
{
  struct declared_table_entry *declared_table_entry;
  int allocation_size;
  // allocate memory for an entry. If the table_descriptor and nodelist
  // input parameters are not NULL, then the allocation size includes
  // the size of those items as well. These items will be NULL
  // at a subordinate node.
  entry_size = sizeof(struct declared_table_entry);
  if (table_descriptor != NULL)
      allocation_size += sizeof(table_descriptor);
  if(nodelist != NULL)
      allocation_size += sizeof(nodelist);
  declared_table_entry = allocate(entry_size);
  declared_table_entry->name           = table_name;
  declared_table_entry->ID             = ID;
  declared_table_entry->table_descriptor = table_descriptor;
  declared_table_entry->nodelist       = nodelist;
  insert_into_list (declared_table_list, declared_table_entry);
}
//
// Part B Functions specific to dropping a declared temporary table
//
// function entered from coordinator node that accepts the request to
// drop a table of a given name
drop_declared_temp(table_name)
{
  struct declared_table_entry *declared_table_entry;
  struct dropped_ID *deferred_entry;
  // lookup in the declared temporary table list for a matching name
  declared_table_entry =
      lookup_in_list(declared_temporary_table_list, table_name);
  // if table doesn't exists, return with an error
  if (declared_table_entry == NULL)
      return(table_doesnt_exists_error);
  // send request to all nodes in the table's nodegroup to drop the
declared
  // temp table
  send_request(declared_table_entry->nodelist,
          drop_declared_temp_atanode(declared_table_entry->id,
              FALSE));
  // did all the nodes succeed?
  if (success)
  {
      // if the table was also created in the current transaction, then
      // all of the nodes in the nodegroup would have dropped the partition
      // and the table is now completely dropped
      if (declared_table_entry->current_state =
      CREATED_IN_THIS_TRANSACTION)
      {
          // remove the declared temp entry
          remove_declared_temp_entry(declared_table_entry, FALSE);
          // send request to the catalog node to release the id used by the
          table send_request(catalog_node,
              release_id(declared_table_entry->id));
      }
  }
  else // one of the nodes failed
  {
      declared_table_entry->current_state = INOPERATIVE;
      // create a 'dropped_ID' entry to be placed in the catalog node's
      // 'deferred_drop' list
      deferred_entry = allocate(sizeof(dropped_ID));
      deferred_entry->id = declared_table_entry->id;
      send_request(catalog_node, insert_into_list(deferred_list,
          deferred_entry));
  }
}
//
// Part B Functions used in drop table, commit, rollback and application
  termination
//
// function to create a declared temporary table (the partition as
// well as the entry in the declared temp table list entry
// is created herein).

// The 'end_transaction' parameter is set to TRUE if a transaction
// is ending via a commit or rollback or at application termination
drop_declared_temp_atanode(id,
          Bool end_transaction)
{
  struct declared_table_entry *declared_table_entry;
  // lookup in the declared temporary table list for a matching ID
  declared_table_entry =
      lookup_in_list(declared_temporary_table_list, ID);
  // if not found, we assume the entry at this node has been dropped
  // earlier or never existed at this node
  if (declared_table_entry == NULL)
      return(success);
  // If this function has been called with the end_transaction flag as
  // TRUE, then the drop is considered final. Otherwise we need to
  // check current state of the table.
  if (end_transaction ||
      declared_table_entry->current_state =
      CREATED_IN_THIS_TRANSACTION)
  {
      // if created in this transaction, then we can drop the partition
      // and the entry altogether; even if the transaction gets rolled
      // back, the table will not need to be 'brought back into existence'
      // call RDBMS's lower level functions to drop the table partition
      // with the id provided.
      drop_table_partition(id);
      // also remove a declared temp entry in the declared temp table list, if
      // this is not the coordinator node. If this is the coordinator node,
      // the entry will be removed in create_declared_temp() processing
      if (current_node != coordinator node)
      {
          // and remove the entry from the list
          remove_declared_temp_entry(declared_table_entry);
      }
  }
  else
  {
      // the table was not created in this transaction, so we need
      // to keep the table partition around in case the transaction is
      // rolled back and the table is restored.
      // However all rows of the table are deleted;
      delete_rows_in_partition(id);
      // set the current state to indicate it was dropped in this transaction
      declared_table_entry->current_state =
      DROPPED_IN_CURRENT_TRANSACTION;
  }
}
// remove and free the memory of a given declared temp table entry
remove_declared_temp_entry(*declared_table_entry)
{
  // remove entry from list
  remove_from_list(declared_table_list, declared_table_entry);
  // free the memory allocated for the entry
  free(declared_table_entry);
}
// release the ID for all the ids specified in the list
release_ids(dropped_ID_list)
{
  struct dropped_ID *dropped_entry;
  // start with first element in dropped list
  dropped_entry = first_element_in(dropped_ID_list);
  // go through all elements in the list
  while (dropped_entry != NULL)
  {
      // release the specific ID
      release_id(dropped entry->id);
      // move to next entry
      dropped_entry = next(dropped_entry);
  }
}
//
// Part C Function used in executing a query against a declared temp table
//
query_declared_temp_table(query_text)
{
  struct declared_table_entry *declared_table_entry;
  table_name = table name accessed in query_text;
  // see if the declared table entry is found
  declared_table_entry =
```

```
lookup_in_list(declared_temporary_table_list, table_name)
if (declared_table_entry == NULL)
{
  // not a declared temporary table, process it like a regular table
  query_regular_table(query_text)
}
else
{
  // compile this normally
  compiled_executable = compile_query(query_text);
  // the compilation identifies if the table is modified with this
  // query
  if (compiled_executable->modifies_declared_temp)
  {
    declared_table_entry->current_state =
    MODIFIED_IN_TRANSACTION;
  }
  run_query(compiled_executable);
}
}
//
// Part D Functions used in commit
//
// modification of regular commit processing at the coordinate node
coord_commit()
{
  // first perform all regular RDBMS commit processing for the
  coordinator
  // node
  etc.;
  etc.;
  etc.;
  // then handle the commit for declared temporary tables
  commit_declared_tables();
  // as normal, send a commit request to all nodes involved in the
  transaction
  send_request(transaction_node_list,
      subord_commit());
  // if all the nodes completed the commit operation successfully
  if (success)
  {
    // all nodes would have dropped relevant temp table partitions;
    // send a single request to the catalog node to release the id list
    send_request(catalog_node, release_ids(dropped_list));
  }
  else
  {
    // cannot continue with a failed commit, rollback the transaction
    coord_rollback();
  }
}
commit_declared_tables()
{
  struct declared_table_entry *declared_table_entry;
  struct dropped_ID *dropped_entry;
  // start with first element in declared table list
  declared_table_entry = first_element_in(declared_table_list);
  // go through all elements in the list
  while (declared_table_entry != NULL)
  {
    // for tables that are marked as dropped in the current transaction,
    // we can now completely get rid of the table
    if (declared_table entry->current_state ==
        DROPPED_IN_CURRENT_TRANSACTION)
    {
      // at this point only drop this node's entry. Other nodes
      // in nodegroup will do their own cleanup automatically
      // without an explicit request
      if (declared_table_entry->at_this_node)
      {
        // a local partition exists, drop it
        drop_table_partition(declared_table_entry->id);
      }
      // keep a record that this table is being dropped
      dropped_entry = allocate(sizeof(struct dropped_ID));
      dropped_entry->ID = declared_table_entry->id;
      insert_into_list(dropped_list, dropped_entry);
```

```
      // remove entry from the list
      remove_declared_temp_entry(*declared_table_entry);
    }
    else
    {
      // reset current_state
      declared_table_entry->current_state = 0;
    }
    // move to next entry
    declared_table_entry = next(declared_table_entry);
  }
}
// modification of regular commit processing at the subordinate node
subord_commit()
{
  // first perform all regular RDBMS commit processing for the
  subordinate
  // node
  etc.;
  etc.;
  etc.;
  // then handle the commit for declared temporary tables for this node's
  // declared temporary table list
  commit_declared_tables_atanode();
}
commit_declared_tables_atanode()
{
  struct declared_table_entry *declared_table_entry;
  // start with first element in declared table list
  declared_table_entry = first_element_in(declared_table_list);
  // go through all elements in the list
  while (declared_table_entry != NULL)
  {
    // for tables that are marked as dropped in the current transaction,
    // we can now completely get rid of the table
    if (declared_table_entry->current_state ==
        DROPPED_IN_CURRENT_TRANSACTION)
    {
      // drop local partition exists, drop it
      drop_table_partition(declared_table_entry->id);
      // remove entry from the list
      remove_declared_temp_entry(*declared_table_entry);
    }
    else
    {
      // reset current_state
      declared_table_entry->current_state = 0;
    }
    // move to next entry
    declared_table_entry = next(declared_table_entry);
  }
}
//
// Part E Functions used in rollback
//
// modification of regular rollback processing
coord_rollback()
{
  // first perform all regular RDBMS rollback processing for the
  // coordinator node
  etc.;
  etc.;
  etc.;
  // then handle the rollback for declared temporary tables
  rollback_declared_tables();
  // as normal, send a rollback request to all nodes involved in the
    transaction
  // However include with the request the action list that has been
  // created in rollback_declare_tables().
  send_request(transaction_node_list,
      subord_rollback(action_list));
  // if all the nodes completed the rollback operation successfully
  if (success)
  {
    // all nodes would have dropped relevant temp table partitions;
    // send a single request to the catalog node to release the id list
    send_request(catalog_node, release_ids(dropped_list));
  }
```

```
    else
    {
        // one of the nodes failed in rolling back the transaction, so
        // we are not guaranteed that all the table partitions in the
        // dropped list have been dropped yet. Add it to deferred drop
        // list.
        send_request(catalog_node,
            multiple_insert_into_list(deferred_drop_list, dropped_list));
        return(rollback_failed)
    }
}
rollback_declared_tables()
{
    struct declared_table_entry *declared_table_entry;
    struct dropped_ID *dropped_entry;
    struct action_entry *action_entry;
    // start with first element in declared table list
    declared_table_entry = first_element_in(declared_table_list);
    // go through all elements in the list
    while (declared_table_entry != NULL)
    {
        // for tables that are marked as created in the current transaction,
        // we should now drop the table
        if (declared_table_entry->current_state ==
            CREATED_IN_CURRENT_TRANSACTION)
        {
            // at this point only drop this node's entry. Other nodes
            // in nodegroup will do their own cleanup automatically
            // without an explicit request
            if (declared_table_entry->at_this_node)
            {
                // a local partition exists, drop it
                drop_table_partition(declared_table_entry->id);
            }
            // keep a record that this table is being dropped
            dropped_entry = allocate(sizeof(struct dropped_ID));
            dropped_entry->ID = declared_table_entry->id;
            insert_into_list(dropped_list, dropped_entry);
            // remove entry from the list
            remove_declared_temp_entry(declared_table_entry);
        }
        else
        {
            // consider what to do with tables if a node failure
            // has occurred
            if ((a node failure has been detected) and
                (declared_table_entry->nodelist has a common node with
                    failed_node_list))
            {
                // the current table has a partition on one of the failed
                // nodes, this table will become inoperative. Drop
                // this table and its partitions on all nodes, but
                // leave the declared_table_entry at the coordinator
                // node marked as inoperative
                if (declared_table_entry->at_this_node)
                {
                    // a local partition exists, drop it
                    drop_table_partition(declared_table_entry->id);
                }
                // mark as inoperative
                declared_table_entry->current_state = INOPERATIVE;
                // keep a record that this table is being dropped
                dropped_entry = allocate(sizeof(struct dropped_ID));
                dropped_entry->ID = declared_table_entry->id;
                insert_into_list(dropped_list, dropped_entry);
                // since subordinate nodes need to be informed of this
                // action, create an 'action entry' that will be
                // sent to subordinate nodes
                action_entry = allocate(sizeof(struct action_ID));
                action_entry->ID = declared_table_entry->id;
                action_entry->action = DROP_TABLE;
                insert_into_list(action_list, action_entry);
                // the current transaction node list might not include
                // all the nodes of the table; since we need all nodes
                // of the table to drop their partitions, we add
                // all the nodes of the table to the transaction node list
                transaction_node_list = transaction_node_list +
                    declared_table_entry->nodelist;
            }
            else
            {
                // Either no node failure has occurred, or this table
                // is not partitioned on one of the nodes that failed.
                // Now check if the table has been modified in the UOW
                if (declared_table_entry->current_state ==
                    MODIFIED_IN_CURRENT_TRANSACTION)
                {
                    // need to delete all rows. If there is a partition
                    // at the coordinator node, do so at this node
                    if (declared_table_entry->at_this_node)
                    {
                        // a local partition exists, drop it
                        delete_rows_in_partition(declared_table_entry->id);
                    }
                    // since subordinate nodes need to be informed of this
                    // action, create an 'action entry' that will be
                    // sent to subordinate nodes
                    action_entry = allocate(sizeof(struct action_ID));
                    action_entry->ID = declared_table_entry->id;
                    action_entry->action = DELETE_ROWS;
                    insert_into_list(action_list, action_entry);
                    // the current transaction node list might not include
                    // all the nodes of the table; since we need all nodes
                    // of the table to delete the rows in their partitions, we add
                    // all the nodes of the table to the transaction node list
                    transaction_node_list = transaction_node_list +
                        declared_table_entry->nodelist;
                }
                // reset current_state of this table entry
                declared_table_entry->current_state = 0;
            }
        }
        // move to next entry
        declared_table_entry = next(declared_table_entry);
    }
}
// modification of regular rollback processing at the subordinate node
subord_rollback(action_list)
{
    // first perform all regular RDBMS rollback processing for the
    // subordinate node
    etc.;
    etc.;
    etc.;
    // then rollback for declared temporary tables for this node's
    // declared temporary table list. Pass in the action list to be processed as
    // well
    rollback_declared_tables_atanode(action_list);
}
rollback_declared_tables_atanode()
{
    struct declared_table_entry *declared_table_entry;
    struct action_entry *action_entry;
    //
    // First process the entries in the action list
    //
    // start with first element in action list
    action_entry = first_element_in(action_list);
    // go through all elements in the list
    while (action_entry != NULL)
    {
        // lookup in the declared temporary table list at current node for a
        matching ID
        declared_table_entry =
            lookup_in_list(declared_temporary_table_list,
                action_entry->ID);
        // if this entry is found, then act on the entry as indicated in the
        action
        // entry
        if (declared_table_entry != NULL)
        {
            if (action_entry->action == DROP_TABLE)
            {
                // call RDBMS's lower level functions to drop the table partition
                // with the id provided.
                drop_table_partition(action->id);
```

```
      // remove entry from the list
      remove_declared_temp_entry(declared_table_entry);
    }
    else if (action_entry->action == DELETE_ROWS)
    {
      // call RDBMS's lower level functions to delete all the rows
      // in this partition of the table
      delete_rows_in_partition(action_entry->id);
    }
  }
  // move to next entry
  declared_table_entry = next(declared_table_entry);
  }
  //
  // Now process the entries in the declared temporary table lust
  //
  // start with first element in declared temp table list at that node
  declared_table_entry = first_element_in(declared_table_list);
  // go through all elements in the list
  while (declared_table_entry != NULL)
  {
    // for tables that are marked as created in the current transaction,
    // we get rid of the table
    if (declared_table_entry->current_state ==
        CREATED_IN_CURRENT_TRANSACTION)
    {
      // drop local partition exists, drop it
      drop_table_partition(declared_table_entry->id);
      // remove entry from the list
      remove_declared_temp_entry(*declared_table_entry);
    }
    else
    {
      // reset current_state
      declared_table_entry->current_state = 0;
    }
    // move to next entry
    declared_table_entry = next(declared_table_entry);
  }
}
//
// Part F Functions used in application termination
//
// general application termination logic (unmodified by invention)
appterm()
{
  if (coord_node != cat_node)
  {
    // when the coordinator is not the catalog node, it first performs
    // coordinator node application cleanup
    appterm_atanode();
    // then a request is sent to all other nodes used on behalf of the
    // application to terminate the application processing at that node.
    send_request(application_node_list (excluding coordinator node
      and catalog node), appterm_atanode());
    // and then a request is sent to the catalog node to do its cleanup last
    send_request(catalog_node, appterm_atanode());
  }
  else
  {
    // when the coordinator is not the catalog node, request is first
    // sent to all other nodes used on behalf of the application,
    // to terminate the application processing at that node.
    send_request(application_node_list (excluding coordinator node),
          appterm_atanode());
  }
}
// application termination logic at a node (modified by application)
appterm_atanode()
{
  // first perform all regular RDBMS application termination processing
  // at a specific node
  etc.;
  etc.;
  etc.;
  // cleanup declared temp tables at a node
  appterm_declared_tables_atanode();
}
// application termination logic at a node (modified by application)
// logic specific to declared temporary tables
appterm_declared_tables_atanode()
{
  struct declared_table_entry *declared_table_entry;
  struct dropped_ID *dropped_entry;
  // start with first element in declared table list
  declared_table_entry = first_element_in(declared_table_list);
  // go through all elements in the list
  while (declared_table_entry != NULL)
  {
    // when drop local partition exists (always at subordinate nodes,
    // at coordinator node, only if the at_this_node field is TRUE)
    // drop it
    if ((this_node != coordinator) or
        (declared_table_entry->at_this_node))
      drop_table_partition(declared_table_entry->id);
    // if this is the coordinator node add a dropped entry
    dropped_entry = allocate(sizeof(struct dropped_ID));
    dropped_entry->ID = declared_table entry->id;
    insert_into_list(dropped_list, dropped_entry);
    // remove entry from the list
    remove_declared_temp_entry(*declared_table_entry);
    // move to next entry
    declared_table_entry = next(declared_table_entry);
  }
  // if this is the coordinator node that is not a catalog node
  // then send a request to add the list of dropped entries to the
  // catalog node's deferred drop list
  if (this_node == coordinator_node and
      this_node != catalog_node)
  {
    send_request(catalog_node,
      multiple_insert_into_list(deferred_drop_list,
          dropped list));
  }
  // if this is the catalog node, release the ids of all the
  // entries in the deferred_drop_list as well as the drop list
  if (this_node == catalog_node)
  {
    release_ids(deferred_drop_list);
    release_ids(dropped_list);
  }
}
//
// Part G Function used by the RDBMS when a node failure is detected
// on another node in the system
//
// function executed by the RDBMS at a given node, when it notes that
// another node has 'failed'
failed_node_recovery(failed_node_list)
{
  struct application_entry app;
  // start with first application
  app = first_element_in(RDBMS application list at this node);
  while (app != NULL)
  {
    // all applications with a transaction involving any of the
    // failed nodes are interrupted
    if (app->transaction_node_list has a node in common with
        failed_node_list)
    {
      // interrupt that application and force a rollback)
      interrupt(app, ROLLBACK);
    }
    else
    {
      // consider applications that have ever been to the node(s)
      // that failed
      if (app->application_node_list has a node in common with
          failed_node_list)
      {
        // if the application has a declared temporary table,
        // it is rolled back
        if (app->has_declared_temp_table)
```

```
        {
            interrupt(app, ROLLBACK);
        }
      }
    }
  }
  // move to next entry
  app_entry = next(app_entry);
  }
}
```

What is claimed is:

1. A multi-node relational database management system for managing a database comprising:
   a catalog node for reserving identifiers for declared temporary tables associated with an application, wherein the catalog node maintains a list of said reserved identifiers;
   a coordinator node for said application, wherein said coordinator node receives said reserved identifiers from said catalog node, and wherein said coordinator node maintains a list of said declared temporary tables;
   at least one subordinate node for said application, said subordinate node having at least one partition of said declared temporary tables; and
   a declared temporary table manager for causing said coordinator node to maintain said list of said declared temporary tables.

2. The multi-node relational database management system of claim 1 wherein said coordinator node maintains for said application a list of said declared temporary tables being dropped.

3. The multi-node relational database management system of claim 1 wherein said coordinator node maintains for said application a list of action entries indicating identification of tables on which actions are to be performed, and actions to be performed.

4. The multi-node relational database management system of claim 1 wherein said coordinator node maintains for said application a transaction node list indicating identification of those nodes involved in a current transaction.

5. The multi-node relational database management system of claim 1 wherein said coordinator node maintains for said applications an application node list for indicating identification of all nodes that have participated in execution of said application.

6. The multi-node relational database management system of claim 1 wherein the said declared temporary table manager causes said subordinate node for said application to maintain a list of said declared temporary tables that are partitioned at said subordinate node.

7. The multi-node relational database management system of claim 1 wherein a node failure list is provided for identifying nodes that have failed.

8. The multi-node relational database management system of claim 1 wherein
   the declared temporary table manager also causes:
   (a) said coordinator node to maintain for said application:
      a list of said declared temporary tables for tracking said temporary tables;
      a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;
      a list of action entries indicating identification of tables on which actions are to be performed, and any actions to be performed to be used to inform subordinate nodes to maintain their partitions of said declared temporary tables in synchronization;
      a transaction node list indicating identification of those nodes involved in a current transaction to inform the subordinate nodes involved in said current transaction to appropriately end a transaction as required for rollback or commit; and;
      an application node list for indicating identification of all nodes that have participated in execution of the application, to identify all subordinate nodes participating in the application so that they can perform node specific application termination processing including cleanup; and
   (b) said subordinate node for said application to maintain a list of said declared temporary tables that are partitioned at said subordinate node for synchronization.

9. The multi-node relational database management system of claim 1 wherein said coordinator node for an application is located at said catalog node; and wherein said at least one subordinate node for an application can be at any node except said application's coordinator node.

10. The multi-node relational database management system of claim 8 wherein said coordinator node for an application is located at said catalog node; and wherein said at least one subordinate node for an application can be at any node except said application's coordinator node.

11. A computer readable storage medium comprising program instructions for establishing a multi-node relational database management system for managing a database comprising, the program instructions for:
   establishing a catalog node for reserving identifiers for declared temporary tables associated with an application, wherein the catalog node maintains a list of said reserved identifiers;
   establishing a coordinator node for said application, wherein said coordinator node receives said reserved identifiers from said catalog node, and wherein said coordinator node maintains a list of said declared temporary tables;
   establishing at least one subordinate node for said application, said subordinate node having at least one partition of said declared temporary tables; and
   establishing a declared temporary table manager for causing said coordinator node to maintain said list of said declared temporary tables.

12. The computer readable medium of claim 11 wherein said coordinator node maintains for said application a list of said declared temporary tables being dropped.

13. The computer readable medium of claim 11 wherein said coordinator node maintains for said application a list of action entries indicating identification of tables on which actions are to be performed, and actions to be performed.

14. The computer readable medium of claim 11 wherein said coordinator node maintains for said application a transaction node list indicating identification of those nodes involved in a current transaction.

15. The computer readable medium of claim 11 wherein said coordinator node maintains for said applications an application node list for indicating identification of all nodes that have participated in execution of said application.

16. The computer readable medium of claim 11 wherein the said declared temporary manager causes said subordinate node for said application to maintain a list of said declared temporary tables that are partitioned at said subordinate node.

17. The computer readable medium of claim 11 wherein a node failure list is provided for identifying nodes that have failed.

18. The computer readable medium of claim 11 wherein the declared temporary table manager also causes
    (a) said coordinator node to maintain for said application:
        a list of said declared temporary tables for tracking said temporary tables;
        a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;
        a list of action entries indicating identification of tables on which actions are to be performed, and any actions to be performed to be used to inform subordinate nodes to maintain their partitions of said declared temporary tables in synchronization;
        a transaction node list indicating identification of those nodes involved in a current transaction to inform the subordinate nodes involved in said current transaction to appropriately end a transaction as required for rollback or commit; and,
        an application node list for indicating identification of all nodes that have participated in execution of the application, to identify all subordinate nodes participating in the application so that they can perform node specific application termination processing including cleanup; and
    (b) said subordinate node for said application to maintain a list of said declared temporary tables that are partitioned at said subordinate node for synchronization.

19. The computer readable medium of claim 11 wherein said coordinator node for an application is located at said catalog node; and wherein said at least one subordinate node for an application can be at any node except said application's coordinator node.

20. A computer readable storage medium comprising program instructions to establish a multi-node relational database management system for managing a database, the program instructions for:
    establishing a node failure list identifying nodes that have failed;
    establishing a catalog node for reserving identifiers for declared temporary tables associated with an application, wherein the catalog node maintains a list of said reserved identifiers;
    establishing a coordinator node for an said application, wherein said coordinator node receives said reserved identifiers from said catalog node, and wherein said coordinator node maintains a list of said declared temporary tables;
    establishing at least one subordinate node for said application, said subordinate node having at least one partition of said declared temporary tables;
    establishing a declared temporary table manager for causing:
        (a) said coordinator node to maintain for said application:
            a list of said declared temporary tables;
            a list of said declared temporary tables being dropped;
            a list of action entries indicating identification of tables on which actions are to be performed, and actions to be performed;
            a transaction node list indicating identification of those nodes involved in a current transaction; and
            an application node list for indicating identification of all nodes that have participated in execution of said application; and;
        (b) said subordinate node for said application to maintain a list of said declared temporary tables that are partitioned at said subordinate node.

21. The computer readable storage medium of claim 20 further comprising program instructions for causing:
    (a) said coordinator node to maintain for said application:
        a list of said declared temporary tables for tracking said temporary tables;
        a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;
        a list of action entries indicating identification of tables on which actions are to be performed, and any actions to be performed to be used to inform subordinate nodes to maintain their partitions of said declared temporary tables in synchronization;
        a transaction node list indicating identification of those nodes involved in a current transaction to inform the subordinate nodes involved in said current transaction to appropriately end a transaction as required for rollback or commit; and,
        an application node list for indicating identification of all nodes that have participated in execution of the application, to identify all subordinate nodes participating in the application so that they can perform node specific application termination processing including cleanup.

22. In a multi-node relational database management system a method for managing a database, the method comprising the steps of:
    (a) using a catalog node for reserving identifiers for declared temporary tables associated with an application, wherein the catalog node maintains a list of said reserved identifiers;
    (b) associating a coordinator node for said application, wherein said coordinator node receives said reserved identifiers from said catalog node, and wherein said coordinator node maintains a list of said declared temporary tables;
    (c) using at least one subordinate node for said application, said subordinate node having at least one partition of said declared temporary tables; and
    (d) using a declared temporary table manager for causing said coordinator node to maintain said list of said declared temporary tables.

23. The method of claim 22 wherein the declared temporary table manager is used for managing said declared temporary tables for causing:

a transaction node list indicating identification of those nodes involved in a current transaction;

an application node list for indicating identification of all nodes that have participated in execution of said application; and wherein said subordinate node for said application is used to maintain a list of said declared temporary tables that are partitioned at said subordinate node.

24. The method of claim 22 wherein said declared temporary table manager is used for managing said declared temporary tables for causing:

(a) said coordinator node to maintain for said application:

a list of said declared temporary tables for tracking said temporary tables;

a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;

a list of action entries indicating identification of tables on which actions are to be performed, and any actions to be performed to be used to inform subordinate nodes to maintain their partitions of said declared temporary tables in synchronization;

a transaction node list indicating identification of those nodes involved in a current transaction to inform the subordinate nodes involved in said current transaction to appropriately end a transaction as required for rollback or commit; and an application node list for indicating identification of all nodes that have participated in execution of the application, to identify all subordinate nodes participating in the application so that they can perform node specific application termination processing including cleanup; and (b) said subordinate node for said application to maintain a list of said declared temporary tables that are partitioned at said subordinate node for synchronization.

25. A multi-node relational database management system for managing a database, the system comprising:

a catalog node for reserving identifiers for declared temporary tables associated with an application, wherein the catalog node maintains a list of said reserved identifiers;

a coordinator node for said application, wherein said coordinator node receives said reserved identifiers from said catalog node, and wherein said coordinator node maintains a list of said declared temporary tables;

at least one partition of said declared temporary tables on said coordinator node; and a declared temporary table manager for causing said coordinator node to maintain said list of said declared temporary tables.

26. A computer readable storage medium comprising program instructions to establish a multi-node relational database management system for managing a database having declared temporary tables associated with respective applications, the program instructions for:

establishing a catalog node for maintaining a list of identifiers for declared temporary tables associated with any application;

establishing a coordinator node for an application;

establishing at least one partition of said declared temporary tables of said application on said coordinator node; and program instructions for establishing a declared temporary table manager for causing said coordinator node to maintain said list of said declared temporary tables.

27. A method for establishing a multi-node relational database management system for managing a database having declared temporary tables associated with respective applications, the method comprising the steps of:

(a) establishing a catalog node for maintaining a list of identifiers for declared temporary tables associated with any application;

(b) establishing a coordinator node for an application;

(c) establishing at least one partition of said declared temporary tables of said application on said coordinator node; and (d) establishing a declared temporary table manager for causing said coordinator node to maintain said list of said declared temporary tables.

28. A multi-node relational database management system for managing a database, the system comprising:

a catalog node for maintaining a list of identifiers for declared temporary tables associated with any application;

a coordinator node for an application;

at least one subordinate node for said application, said subordinate node having at least one partition of said declared temporary tables of said application; and a declared temporary table manager for causing said coordinator node to maintain for said application a list of said declared temporary tables, wherein the declared temporary table manager also causes:

(a) said coordinator node to maintain for said application:

a list of said declared temporary tables for tracking said temporary tables;

a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;

a list of action entries indicating identification of tables on which actions are to be performed, and any actions to be performed to be used to inform subordinate nodes to maintain their partitions of said declared temporary tables in synchronization;

a transaction node list indicating identification of those nodes involved in a current transaction to inform the subordinate nodes involved in said current transaction to appropriately end a transaction as required for rollback or commit; and an application node list for indicating identification of all nodes that have participated in execution of the application, to identify all subordinate nodes participating in the application so that they can perform node specific application termination processing including cleanup; and (b) said subordinate node for said application to maintain a list of said declared temporary tables that are partitioned at said subordinate node for synchronization.

29. A multi-node relational database management system for managing a database comprising:

a catalog node for maintaining a list of identifiers for declared temporary tables associated with any application;

a coordinator node for an application;

at least one subordinate node for said application, said subordinate node having at least one partition of said declared temporary tables of said application, wherein said coordinator node for an application is located at said catalog node; and wherein said at least one subordinate node for an application can be at any node except said application's coordinator node; and a declared temporary table manager for causing said coordinator node to maintain for said application a list of said declared temporary tables, wherein the declared temporary table manager also causes:

(a) said coordinator node to maintain for said application:

a list of said declared temporary tables for tracking said temporary tables;

a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;

a list of action entries indicating identification of tables on which actions are to be performed, and any actions to be performed to be used to inform subordinate nodes to maintain their partitions of said declared temporary tables in synchronization;

a transaction node list indicating identification of those nodes involved in a current transaction to inform the subordinate nodes involved in said current transaction to appropriately end a transaction as required for rollback or commit; and an application node list for indicating identification of all nodes that have participated in execution of the application, to identify all subordinate nodes participating in the application so that they can perform node specific application termination processing including cleanup; and (b) said subordinate node for said application to maintain a list of said declared temporary tables that are partitioned at said subordinate node for synchronization.

30. A computer readable storage medium containing program instructions to establish a multi-node relational database management system for managing a database comprising:

establishing a catalog node for maintaining a list of identifiers for declared temporary tables associated with any application;

establishing a coordinator node for an application; program instructions for establishing at least one subordinate node for said application, said subordinate node having at least one partition of said declared temporary tables of said application; and, establishing a declared temporary table manager for causing:

(a) said coordinator node to maintain for said application:

a list of said declared temporary tables;

a list of said declared temporary tables for tracking said temporary tables;

a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;

a list of action entries indicating identification of tables on which actions are to be performed, and any actions to be performed to be used to inform subordinate nodes to maintain their partitions of said declared temporary tables in synchronization;

a transaction node list indicating identification of those nodes involved in a current transaction to inform the subordinate nodes involved in said current transaction to appropriately end a transaction as required for rollback or commit; and an application node list for indicating identification of all nodes that have participated in execution of the application, to identify all subordinate nodes participating in the application so that they can perform node specific application termination processing including cleanup; and (b) said subordinate node for said application to maintain a list of said declared temporary tables that are partitioned at said subordinate node for synchronization.

31. A computer readable storage medium for containing program instructions to establish a multi-node relational database management system for managing a database comprising:

a node failure list identifying nodes that have failed;

program instructions for establishing a catalog node for maintaining a list of identifiers for declared temporary tables associated with any application;

program instructions for establishing a coordinator node for an application;

program instructions for establishing at least one subordinate node for said application, said subordinate node having at least one partition of said declared temporary tables of said application;

program instructions for establishing a declared temporary table manager for causing:

(a) said coordinator node to maintain for said application:

a list of said declared temporary tables;

a list of said declared temporary tables for tracking said temporary tables;

a list of said declared temporary tables being dropped;

a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;

a list of action entries indicating identification of tables on which actions are to be performed, and actions to be performed;

a list of action entries indicating identification of tables on which actions are to be performed, and any actions to be performed to be used to inform subordinate nodes to maintain their partitions of said declared temporary tables in synchronization;

a transaction node list indicating identification of those nodes involved in a current transaction;

a transaction node list indicating identification of those nodes involved in a current transaction to inform the subordinate nodes involved in said current transaction to appropriately end a transaction as required for rollback or commit;

an application node list for indicating identification of all nodes that have participated in execution of said application; and an application node list for indicating identification of all nodes that have participated in execution of the application, to identify all subordinate nodes participating in the application so that they can perform node specific application termination processing including cleanup; and (b) said subordinate node for said application to maintain a list of said declared temporary tables that are partitioned at said subordinate node.

32. In a multi-node relational database management system a method for managing a database comprising:

using a catalog node for maintaining a list of identifiers for declared temporary tables associated with any application;

associating a coordinator node for an application;

using at least one subordinate node for said application, said subordinate node having at least one partition of said declared temporary tables of said application; and using a declared temporary table manager for causing:
   (a) said coordinator node to maintain for said application a list of said declared temporary tables;
   wherein the declared temporary table manager is used for managing said declared temporary tables for causing:
      a transaction node list indicating identification of those nodes involved in a current transaction; and
      an application node list for indicating identification of all nodes that have participated in execution of said application; and
   (b) said subordinate node for said application to maintain a list of said declared temporary tables that are partitioned at said subordinate node.

33. In a multi-node relational database management system a method for managing a database, the method comprising the steps of:

(a) using a catalog node for maintaining a list of identifiers for declared temporary tables associated with any application;

(b) associating a coordinator node for an application;

(c) using at least one subordinate node for said application, said subordinate node having at least one partition of said declared temporary tables of said application;

(d) using a declared temporary table manager for causing said coordinator node to maintain for said application a list of said declared temporary tables, wherein said declared temporary table manager is used for managing said declared temporary tables for causing:
   (d1) said coordinator node to maintain for said application:
      (d1i) a list of said declared temporary tables for tracking said temporary tables;
      (d1ii) a list of said declared temporary tables being dropped containing information to be sent to said catalog node to inform it of declared temporary tables being dropped so said catalog node can release the identification of said declared temporary tables being dropped or add said identification to its deferred drop list to release said identification when execution of said application ends;
      (d1iii) a list of action entries indicating identification of tables on which actions are to be performed, and any actions to be performed to be used to inform subordinate nodes to maintain their partitions of said declared temporary tables in synchronization;
      (d1iv) a transaction node list indicating identification of those nodes involved in a current transaction to inform the subordinate nodes involved in said current transaction to appropriately end a transaction as required for rollback or commit; and
      (d1v) an application node list for indicating identification of all nodes that have participated in execution of the application, to identify all subordinate nodes participating in the application so that they can perform node specific application termination processing including cleanup; and
   (d2) said subordinate node for said application to maintain a list of said declared temporary tables that are partitioned at said subordinate node for synchronization.

* * * * *

UNITED STATES PATENT AND TRADEMARK OFFICE
CERTIFICATE OF CORRECTION

PATENT NO. : 6,735,605 B2
DATED : May 11, 2004
INVENTOR(S) : Paul M. Bird et al.

It is certified that error appears in the above-identified patent and that said Letters Patent is hereby corrected as shown below:

Column 34,
Line 13, remove "and;" and replace with -- and, --.

Column 35,
Line 58, remove "an".

Signed and Sealed this

Twenty-first Day of September, 2004

JON W. DUDAS
*Director of the United States Patent and Trademark Office*